United States Patent
Casini et al.

(10) Patent No.: US 8,094,672 B2
(45) Date of Patent: Jan. 10, 2012

(54) METHOD OF PACKET MODE DIGITAL COMMUNICATION OVER A TRANSMISSION CHANNEL SHARED BY A PLURALITY OF USERS

(75) Inventors: Enrico Casini, Leiden (NL); Oscar Del Rio Herrero, Leiden (NL); Riccardo De Gaudenzi, Leiden (NL); Daniel Maurice Eliane Delaruelle, Sint-Niklaas (BE); Jean-Pierre Georges Joseph Ghislain Choffray, Bovigny (BE)

(73) Assignee: Agence Spatiale Europeenne (FR)

( * ) Notice: Subject to any disclaimer, the term of this patent is extended or adjusted under 35 U.S.C. 154(b) by 1628 days.

(21) Appl. No.: 11/342,980

(22) Filed: Jan. 30, 2006

(65) Prior Publication Data

US 2006/0171418 A1 Aug. 3, 2006

(30) Foreign Application Priority Data

Jan. 31, 2005 (FR) .................................. 05 00934

(51) Int. Cl.
*H04W 4/00* (2009.01)
*H04J 4/00* (2006.01)
*H04L 12/413* (2006.01)

(52) U.S. Cl. ......... 370/447; 370/330; 370/436; 370/478
(58) Field of Classification Search .............. 370/447, 370/330, 436, 478
See application file for complete search history.

(56) References Cited

U.S. PATENT DOCUMENTS

| | | | | |
|---|---|---|---|---|
| 5,434,847 A * | 7/1995 | Kou | ............................. | 370/252 |
| 5,768,254 A * | 6/1998 | Papadopoulos et al. | ...... | 370/201 |
| 6,643,275 B1 * | 11/2003 | Gustafsson et al. | ......... | 370/328 |
| 6,697,855 B1 * | 2/2004 | Le Dantec et al. | ............ | 709/223 |
| 2002/0089959 A1 | 7/2002 | Fischer et al. | | |
| 2002/0167920 A1 * | 11/2002 | Miyazaki et al. | .............. | 370/329 |
| 2002/0191560 A1 * | 12/2002 | Chen et al. | ..................... | 370/331 |
| 2002/0196748 A1 * | 12/2002 | De Mier | ........................ | 370/310 |
| 2003/0027580 A1 * | 2/2003 | Goodjohn et al. | ............ | 455/453 |
| 2003/0174663 A1 * | 9/2003 | Dillon | ............................ | 370/316 |
| 2004/0008726 A1 * | 1/2004 | Kelly et al. | ..................... | 370/468 |
| 2005/0013249 A1 * | 1/2005 | Kong et al. | ..................... | 370/235 |
| 2005/0249114 A1 * | 11/2005 | Mangin et al. | ................. | 370/229 |
| 2006/0085551 A1 * | 4/2006 | Xie et al. | ....................... | 709/231 |

FOREIGN PATENT DOCUMENTS

WO WO 01/17171 A 3/2001

OTHER PUBLICATIONS

Dillon D., "Differentiated quality of service slotted ALOHA" *Computer Communications and Networks*, 2004, pp. 343-346.
International Search Report.

* cited by examiner

*Primary Examiner* — Ricky Ngo
*Assistant Examiner* — Paul Masur
(74) *Attorney, Agent, or Firm* — Alston & Bird LLP

(57) ABSTRACT

A first aspect of the invention is a method of transmitting data packets over a transmission channel shared by a plurality of users, based on the time and/or frequency diversity slotted Aloha technique, in which at least two replicas of each packet to be transmitted are sent over said transmission channel, wherein each replica transports signaling information enabling the other replica(s) of the same packet to be located in the time and/or frequency domain. A second aspect of the invention is a method of recovering packets in the receiver, the method exploiting said signaling information to execute an interference cancellation algorithm for recovering packets corrupted by collisions caused by access conflicts. Other aspects of the invention are a transmitter equipment and a receiver packet recovery equipment adapted to use said methods.

30 Claims, 18 Drawing Sheets

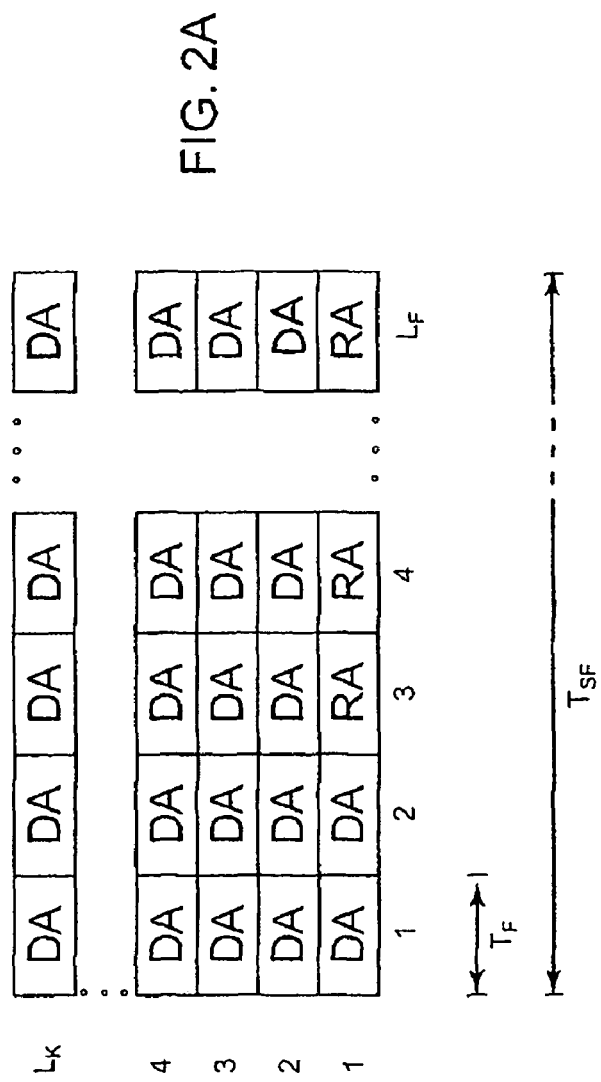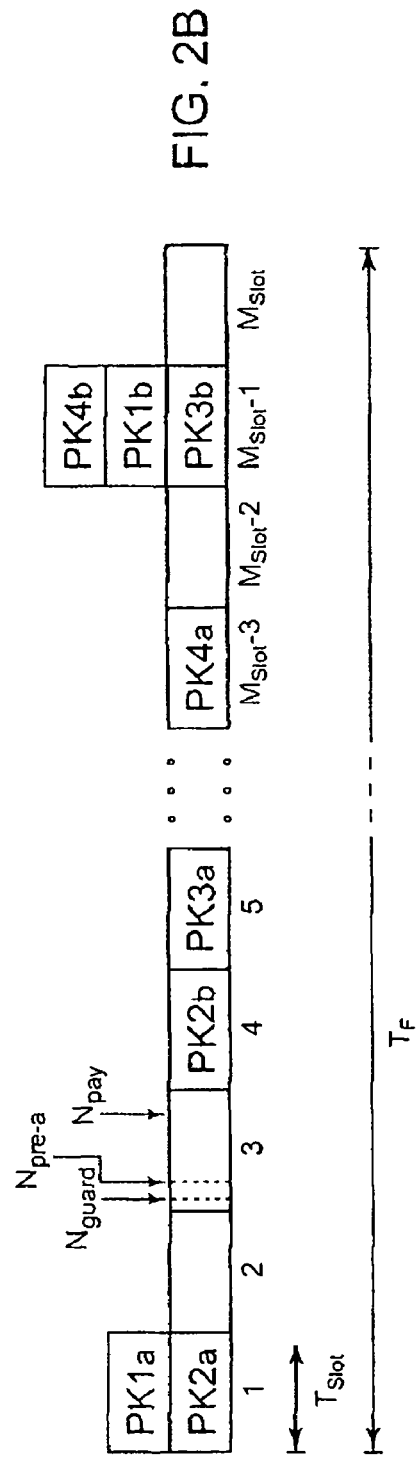

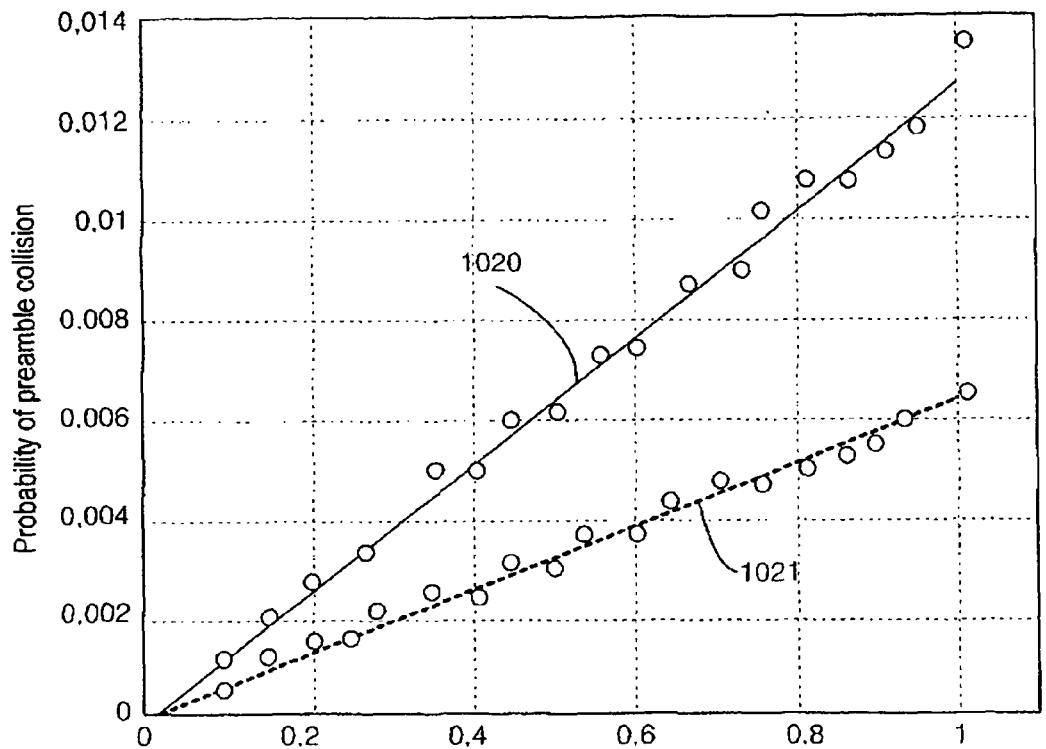
FIG. 10C
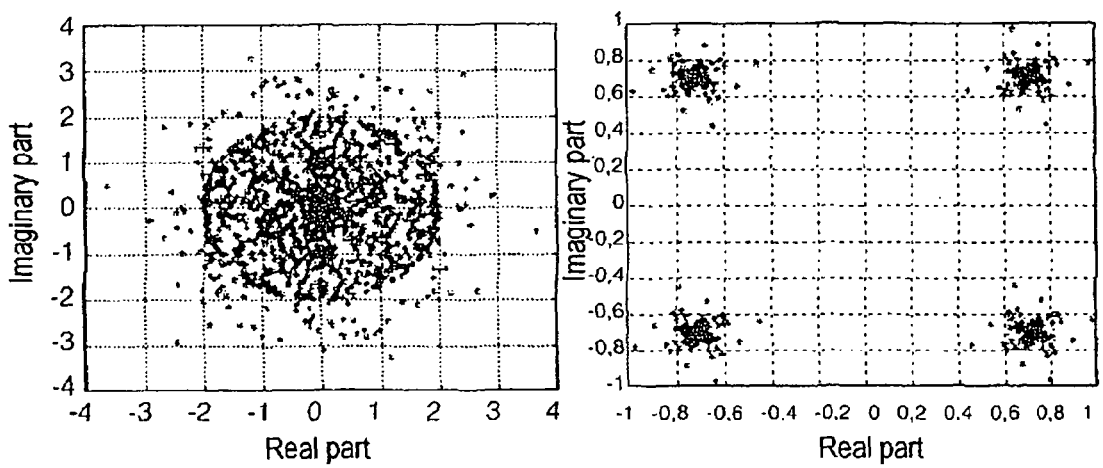
FIG. 10D
FIG. 10E

FIG. 10J
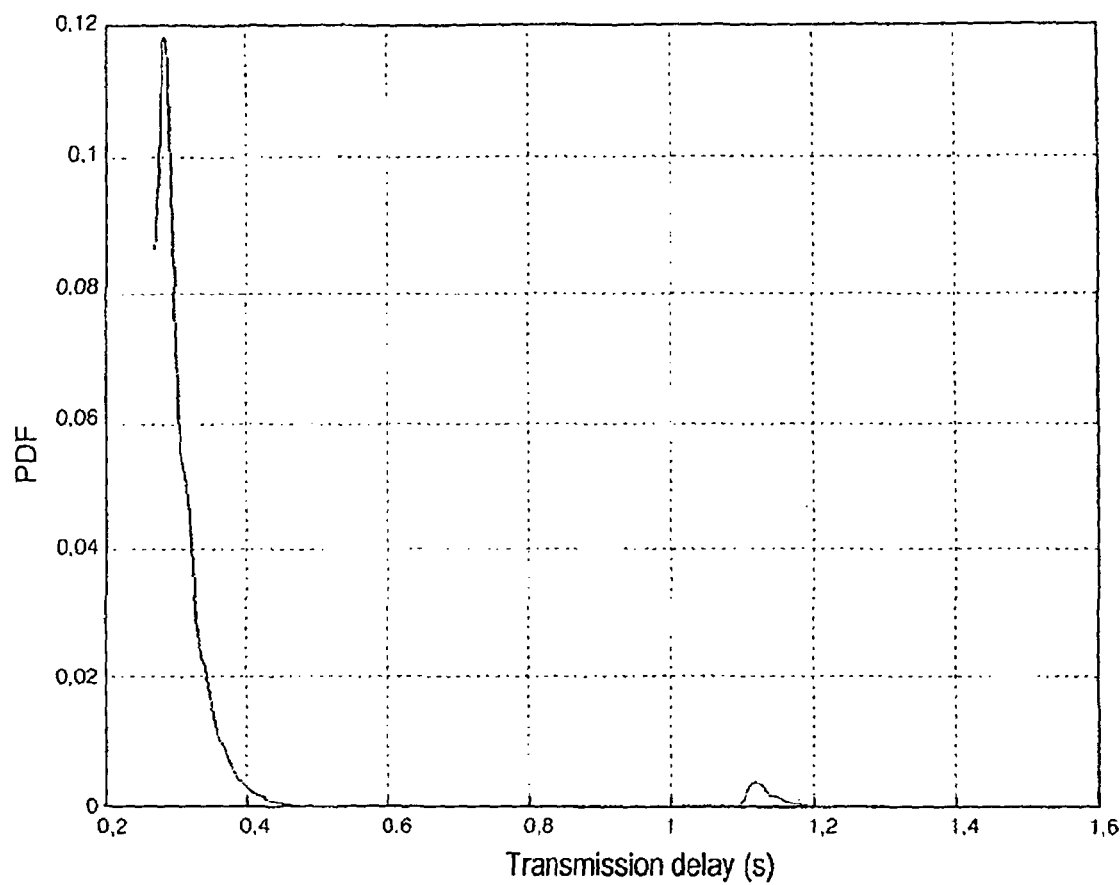
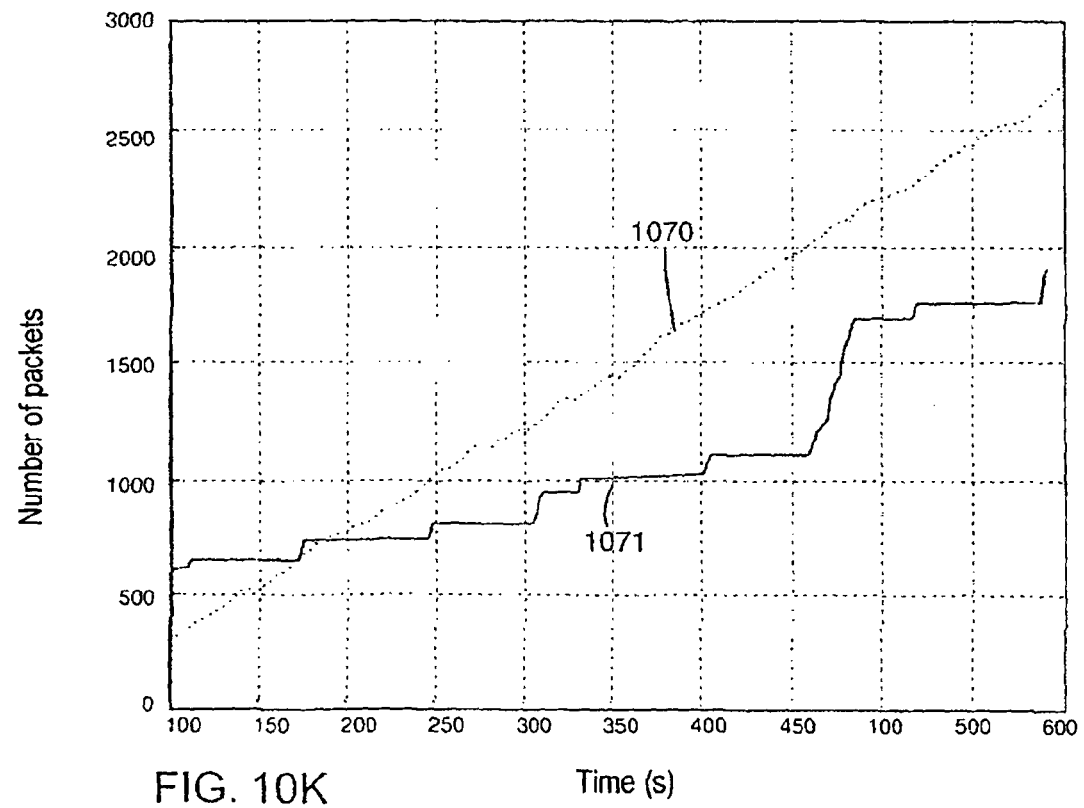
FIG. 10K

FIG. 10L
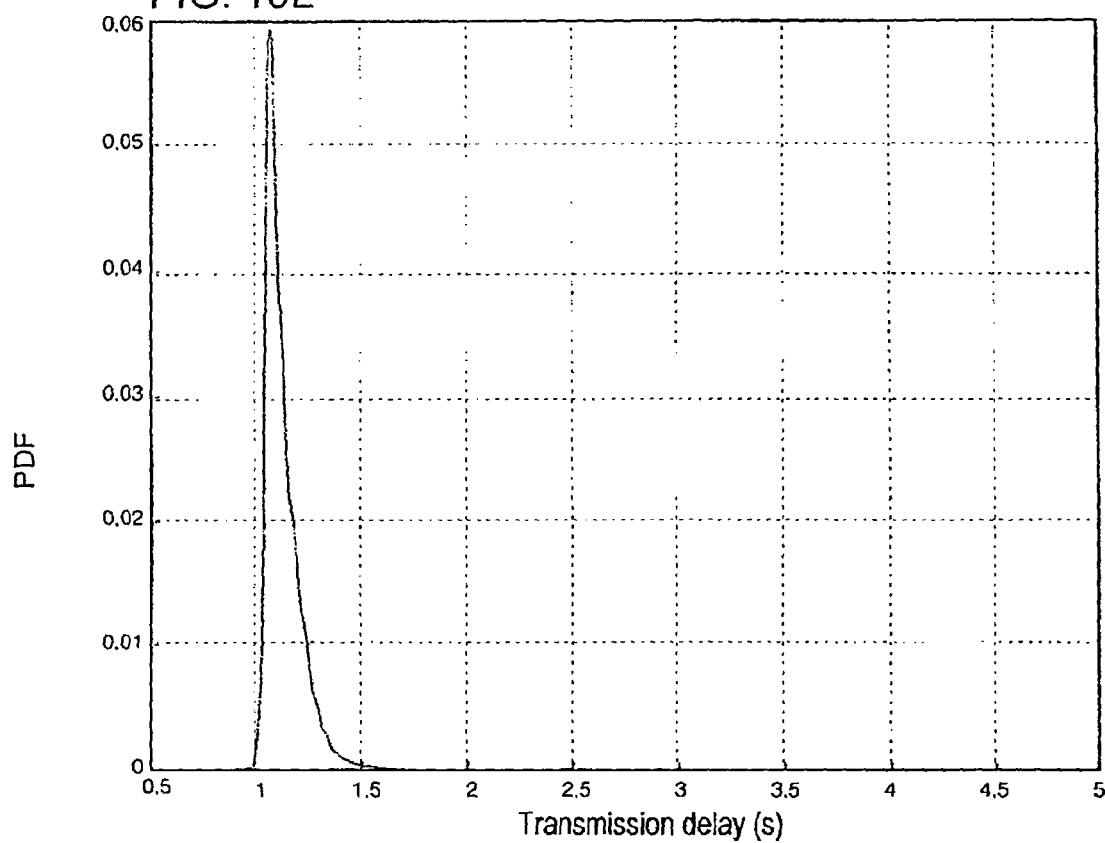
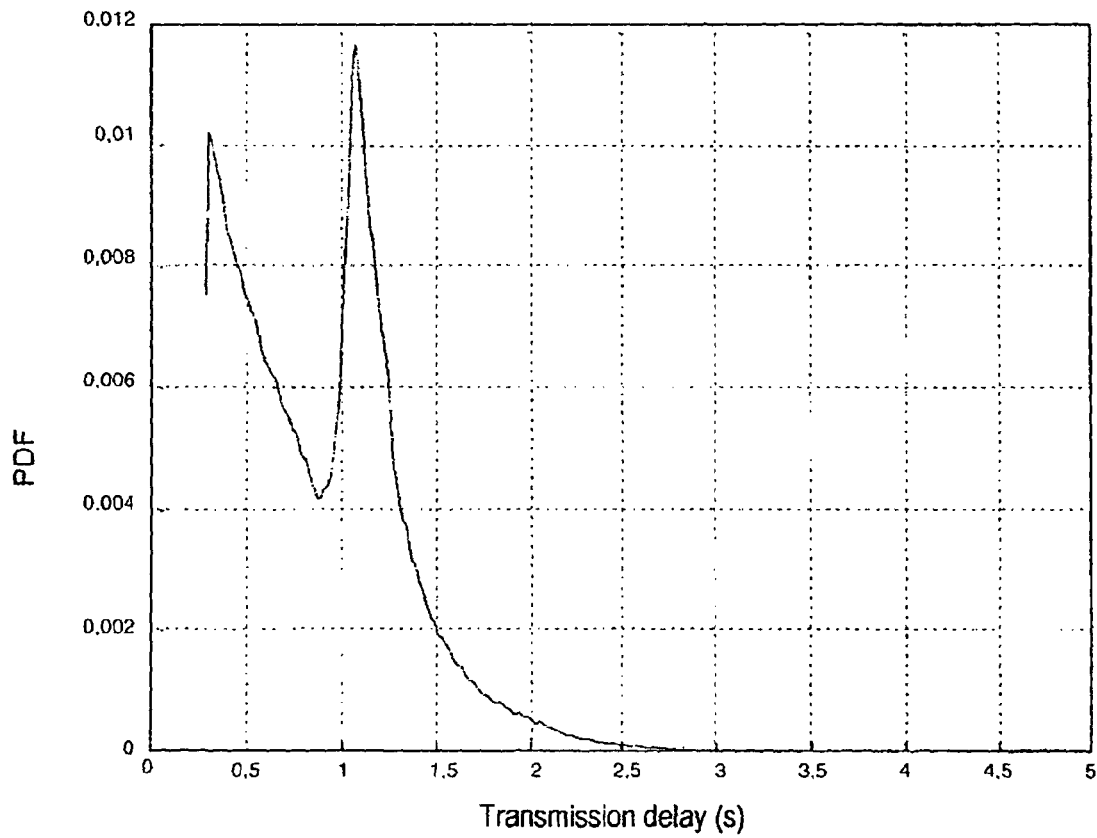
FIG. 10M

METHOD OF PACKET MODE DIGITAL COMMUNICATION OVER A TRANSMISSION CHANNEL SHARED BY A PLURALITY OF USERS

The invention relates to a method of packet mode digital communication over a transmission channel shared by a plurality of users. In particular, it seeks to resolve the majority of access conflict situations that arise when two or more users seek to transmit simultaneously over said channel.

The invention lends itself to varied applications, but was more specifically developed in the context of digital video broadcasting with a return channel via satellite or broadband access systems via satellite (for example those conforming to the ETSI DVB-RCS standard or the TIA IPoS standard).

BACKGROUND OF THE INVENTION

The introduction of low-cost interactive satellite terminals requires the development of multiple-access protocols capable of supporting a wide variety of traffic profiles characterizing different user classes. In particular, residential users generate a large volume of bursty traffic with a low utilization coefficient, for which demand assignment (DA) protocols routinely used in satellite communications systems are not very efficient because they introduce long transmission delays or inefficiencies linked to the signaling required by resource allocation systems. This problem is familiar to the person skilled in the art: on this topic see "Digital Video Broadcasting Return Channel via Satellite (DVB-RCS) Background Book", 15 Nov. 2002, distributed by Nera Broadband Satellites AS, Bergerveien 12 PO Box 91 N-1375 Billingstad, Norway. Section 1.4.3 of the above work explains that the only access method that it is practical to use in such conditions is the slotted Aloha (SA) protocol, although this has only a low real efficiency of use of the capacity of the channel if the probability of loss of packets is to be acceptable, i.e, sufficiently low. Section 10.3.3.3 of "ETSI TR 101 790 v1.2.1 (2003-01)—Digital Video Broadcasting (DVB); Interaction Channel for Satellite Distribution Systems; Guidelines for the use of EN 301 790" also discloses the use of the Aloha protocol for the return channel in a satellite digital video broadcasting system. That document, and the ETSI document EN 301 790 V.1.3.1, March 2003, define standards for the interactive channel in the context of the satellite DVB standard, and are available from the European Telecommunications Standards Institute (ETSI), 650 Route des Lucioles, F-06921 Sophia Antipolis Cedex, France.

In practice, the Aloha protocol is essentially used for signaling and transmission capacity assignment request functions and sometimes for transmitting small data packets.

The Aloha protocol is a random access (RA) protocol developed in 1970: see N. Abramson, "The Aloha System—another Alternative for Computer Communications", AFIPS Conf. Proc. Vol. 37, pp. 281-285, 1970. This basic principle is extremely simple: each user transmits data independently of the others and awaits an acknowledgement. If no acknowledgement is received, the user retransmits the same data with a random delay, and this procedure continues until the data is received correctly. Obviously, if two or more users transmit simultaneously, an access conflict arises, in other words a collision, which may entail the loss of the transmitted data (this is known as a "destructive" collision). For this reason, the system can function only if the utilization coefficient of each user (the fraction of the time actually used for transmission) is low. Statistical analysis shows that the maximum normalized bit rate that can be obtained is of the order of only 18%. That maximum bit rate is obtained when the number of attempts to transmit packets of unit duration per unit time is equal to 0.5.

The slotted Aloha (SA) protocol is a variant of the "pure" Aloha protocol that doubles the maximum bit rate compared to the above situation. A normalized bit rate of the order of 36% is therefore obtained when the number of attempts to transmit packets of unitary duration per unit time is equal to 1. This improvement in service is obtained by synchronizing users, dividing time into slots of predetermined duration (for example equal to the transmission time of a data packet), and transmitting the packets in corresponding relationship to said slots. On this topic see L. G. Roberts "ALOHA Packet Systems with and without Slots and Capture" ARPANET System note 8 (NIC11290), June 1972.

The paper by Gagan L. Chouldhury and Stephen S. Rappaport "Diversity ALOHA—A Random Access Scheme for Satellite Communications", IEEE Transactions on Communications, vol. COM-31, No. 3, March 1983, describes an improvement to the SA protocol called the diversity slotted Aloha (DSA) protocol. The basic principle of that protocol is to transmit k>1 replicas of each packet, either with a random time shift (in TDMA systems), or simultaneously on channels of different frequency (in FDMA systems). That paper shows that by choosing the value of k appropriately it is possible to improve the performance of the SA protocol, as much in terms of capacity as of transmission delay, in particular if the system is not heavily loaded (fewer than one transmission attempt per unit time). Since the advantages of that variant are relatively limited, the SA protocol remains the most widely used protocol. One rare example of applications of the DSA protocol is the IPoS standard developed by the Telecommunication Industry Association (TIA), described in the document TIA-1008 "IP over Satellite", October 2003.

In reality, for transmission delays and the packet loss rate to remain within acceptable limits, the protocols of the Aloha family must be used with a mean standardized loading (number of packets transmitted per time slot, or number of packets of unitary duration per unit time in the case of the pure SA protocol) of the order of only 2 to 5%, which gives mean bit rates much lower than the above-mentioned theoretical maximum values, with limited differences between the "pure" Aloha, SA and DSA protocols. On this topic see the paper by D. Raychaudhuri and K. Joseph "Channel Access Protocols for Ku-band VSAT networks: A Comparative Evaluation", IEEE Comm. Magazine, Vol. 26, No. 5, pages 34-44, May 1998.

OBJECTS AND SUMMARY OF THE INVENTION

There is therefore a need for a method of controlling random access to the medium, that offers better performance than the SA protocol and that is usable in the context of a satellite communications system or an interactive television system. The method should apply to proprietary systems and also to standardized systems, and among others, those that conform to the DVB-RCS standard or the IPOS standard. Such a method should advantageously require only a limited number of modifications at the level of the physical layer of the TDMA-FM systems (time division multiple access multiple frequency) used at present. Such a method should also advantageously be combinable easily with demand assignment (DA) methods in order to be able to manage efficiently a great diversity of traffic profiles. This need is accentuated by the development of interactive "consumer" satellite terminals that reduce traffic aggregation at the satellite terminal and consequently are pushing toward increased use of random access protocols.

A first object of the present invention is to provide a method of transmitting data packets based on an improvement to the diversity slotted Aloha protocol that makes it possible, when one of the replicas of a packet is received, to locate in the time and/or the frequency domain the other replica(s) of the same packet, even if corrupted by collisions to the point of no longer being decodable correctly. Such a method can be used with the object of transmission channel diagnosis, but it is above all beneficial in that it enables a transmitted packet recovery method to be implemented at the receiver.

Providing such a packet recovery method is a second object of the invention.

The simultaneous use of such a transmission method and such a packet recovery method in the receiver constitutes a new communications protocol with control of random access to the medium that its inventors call the contention resolution diversity slotted Aloha (CRDSA) protocol.

Another object of the invention is to combine said CRDSA protocol with a conventional DA protocol to obtain a protocol for efficiently managing very different traffic profiles that vary in time. Such a protocol is referred to below as a CRDSA-DA protocol.

Other objects of the invention are to provide a transmitter equipment ("modulator") and a receiver packet recovery equipment ("demodulator") adapted to implement the CRDSA or CRDSA-DA protocol, in particular in the context of an interactive satellite system.

A first aspect of the invention therefore provides a method for transmitting data packets over a transmission channel shared by a plurality of users. Such a method comprises steps of:

generating at least two replicas of each packet to be transmitted; and
sending said replicas over said transmission channel, separated by random time and/or frequency shifts, and further comprises a step of inserting signaling information into each replica for enabling the other replica(s) of the same packet to be located in the time and/or frequency domain.

Said generation step preferably comprises generating exactly two replicas of each packet to be transmitted.

Another aspect of the invention is a method for recovering in a receiver data packets transmitted over a transmission channel shared by a plurality of users using a method of the invention. Such a method comprises steps of:

identifying, in a received signal, replicas that are not affected by destructive collisions with replicas of other packets; and
extracting information contained in the identified replicas, and further comprises steps of:

locating other replica(s) of the same packet in the time and/or frequency domain using signaling information extracted from the identified replicas;
canceling said other replica(s) at complex baseband level using an interference cancellation algorithm if they are affected by destructive collisions with replicas of other packets; and
identifying replicas of other packets which, after said cancellation step, are no longer affected by destructive collisions, and extracting information contained therein.

Another aspect of the invention is equipment for transmitting data packets over a transmission channel shared by a plurality of users, the equipment comprising:

a device for generating at least two replicas of each packet to be transmitted with a random time and/or frequency shift between them; and
a device for sending said replicas over said transmission channel, and further comprising:

a device for generating, for each replica, signaling information for locating other replica(s) of the same packet in the time and/or frequency domain; and
a first multiplexer for assembling each replica and the corresponding signaling information for the conjoint transmission thereof.

Another aspect of the invention is equipment for recovering in a receiver data packets transmitted over a transmission channel shared by a plurality of users using a method of the invention, the equipment comprising:

a device for identifying replicas that are not affected by destructive collisions with replicas of other packets; and
a device for extracting information contained in the identified replicas, and further comprising:

a device for using the extracted signaling information to locate other replica(s) of the same packet in the time and/or frequency domain; and
a device for canceling said other replica(s) at complex baseband level using an interference cancellation algorithm if it is or they are affected by destructive collisions with replicas of other packets.

BRIEF DESCRIPTION OF THE DRAWINGS

Other features, details and advantages of the invention emerge on reading the following description given with reference to the appended drawings, which are provided by way of example and in which:

FIGS. 2A and 2B together constitute a diagram of the distribution of resources in a TDMA-MF system using the CRDSA method of the invention;

FIGS. 10A-10M are graphs showing the performance of the invention and comparisons with prior art methods;

MORE DETAILED DESCRIPTION

The invention is described below with reference to a satellite communications system in which a plurality of users, each having their own satellite terminal, are connected via a "transparent" multibeam satellite to gateways providing access to a terrestrial network. This is not limiting on the scope of the invention, which may be applied to different communications systems using, for example, regenerator satellites and/or terrestrial wireless connections, or even cable connections.

Figure 1:
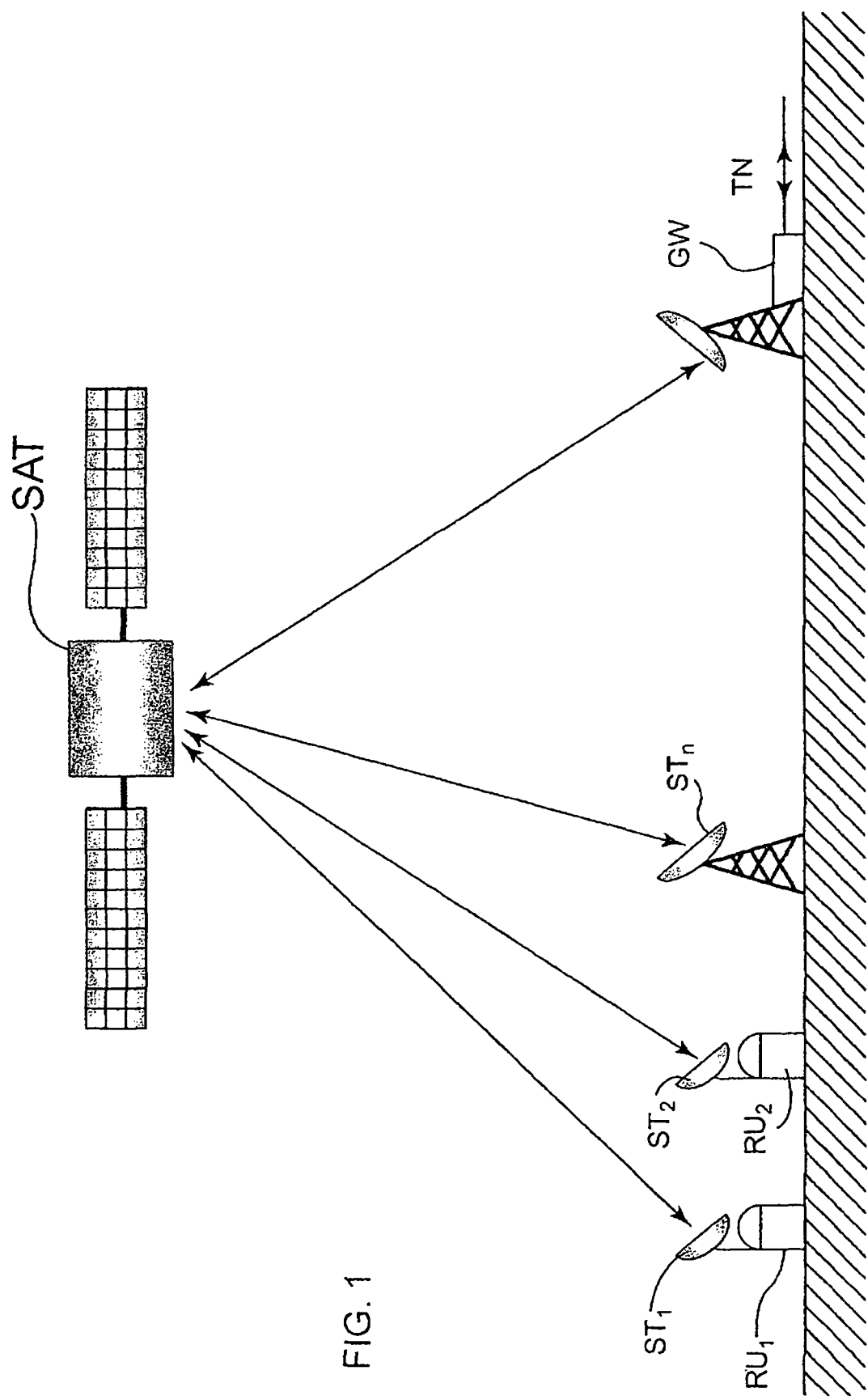
FIG. 1 is a diagram of a satellite communications system to which the invention may be applied.

FIG. 1 is a diagram of a satellite communications system adapted to implement the present invention. Such a system comprises n terrestrial satellite terminals $ST_1 \ldots ST_n$ able to set up a bidirectional connection with a receiver station, such as a gateway GW, via a satellite SAT, said gateway GW being in turn connected to a terrestrial network TN, such as the Internet. The terminals $ST_1$ and $ST_2$ are "residential" terminals, which serve only one respective user $RU_1$, $RU_2$. For example, these may be small terminals installed in the home of a person and used to provide a connection to the Internet and/or to a digital television service with a return channel. These terminals use the uplink of the communications channel to transmit small data packets in accordance with a traffic profile that conforms to a Poisson distribution. The system also comprises a certain number of terminals, generally a very small minority of the terminals, having different characteristics, the terminal $ST_n$ transmits large packets, generating a "bulky traffic" type traffic profile. The various terminals share the same transmission channel using a time division multiple access multiple frequency (TDMA-MF) technique.

FIG. 2A is a diagram of a superframe SF in such a TDMA-MF system. The system comprises $L_K$ frequency channels; for each channel, a superframe has a duration $T_{SF}$ and is divided into $L_F$ frames, each having a duration $T_F$. The frames may be in turn divided into time slots. In the system shown here, all the frames of channels $2$-$L_K$ and the first two frames of channel 1 are assigned using a demand assignment (DA) method, whereas the frames $3$-$L_F$ of channel 1 are reserved for a random access (RA) method, such as the CRDSA method.

As shown in FIG. 2B, a CRDSA frame consists of $M_{slot}$ time slots each of duration $T_{slot}$. Each of these time slots consists of $N_{slot}$ symbols: $N_{guard}$ guard symbols intended to prevent the loss of information in the event of imperfect synchronization between the various users, $N_{pay}$ payload symbols, and $N_{pre-a}$ acquisition preamble (or for simplicity "preamble") symbols. Each symbol has a duration $T_S$. It follows that $T_{slot}=N_{slot} \times T_S$.

As in a DSA method with k=2, each packet PK1-PK4 is transmitted as two replicas a and b, known as "twin replicas". As in any Aloha method, each user (for example each residential user subscribing to an interactive television service) transmits independently of the others, which can cause collisions (collision between the replicas PK1a and PK2a in the first time slot and between the replicas PK1b, PK3b and PK4b in slot number $M_{slot}-1$).

Figure 3A:
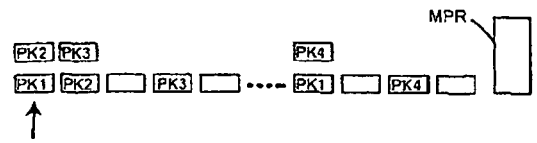
FIGS. 3A-3P show a first implementation of a receiver packet recovery method of the invention.

In the situation represented in FIG. 3A, there is a first collision between the replica a of the packet PK1 and that of the packet PK2, a second collision between the replicas PK2b and PK3a, and a third collision between the replicas PK1b and PK4a. If a conventional DSA method were used, the packets PK1 and PK2 would be lost irrecoverably, since both of their replicas would have suffered a collision. It would then remain only to retransmit them, with no guarantee that the second transmission would be successful. It can happen that a packet has to be retransmitted several times before it is received correctly (without collisions), which is liable to generate long or even unacceptable delays.

One of the basic ideas of the present invention is to use the known packets PK3 and PK4, replicas of which have not suffered any collision, to recover the packets PK1 and PK2 corrupted by collisions using an interference cancellation algorithm. This is made possible by each sender using a transmission method that constitutes a first aspect of the invention and each receiver station using a transmitted packet recovery method that constitutes a second aspect of the invention.

Figure 3B:
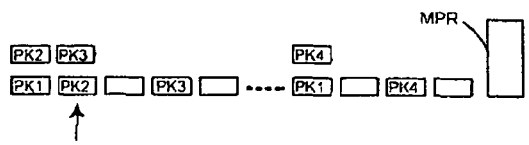
Figure 3C:
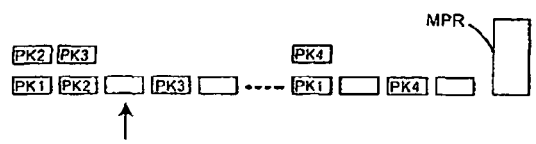
Figure 3D:
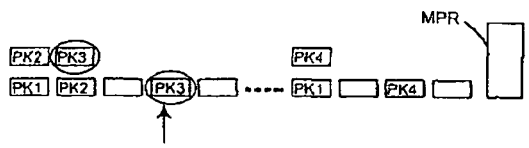
Figure 3E:
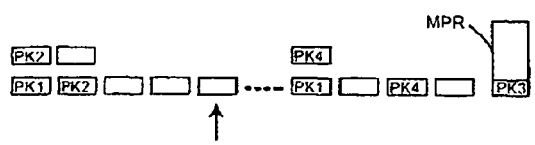
Figure 3F:
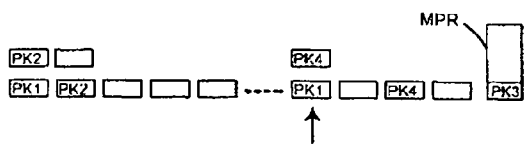
Figure 3G:
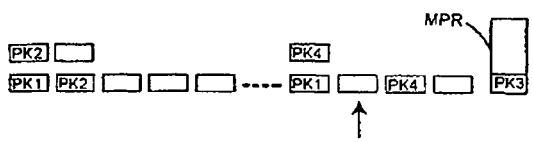
Figure 3H:
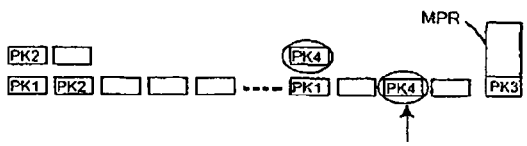
Figure 3I:
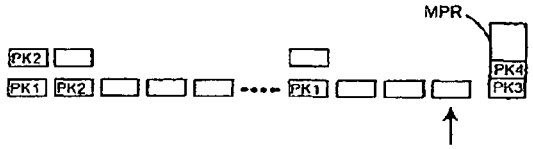
Figure 3J:
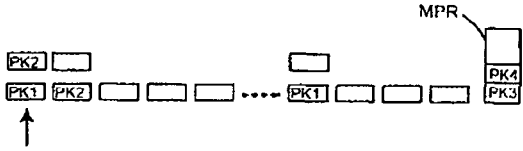
Figure 3K:
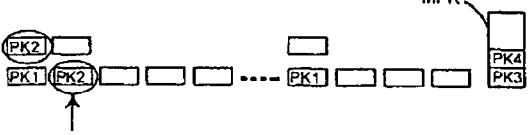
Figure 3L:
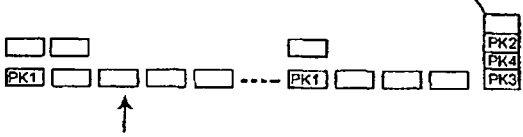
Figure 3M:
Figure 3N:
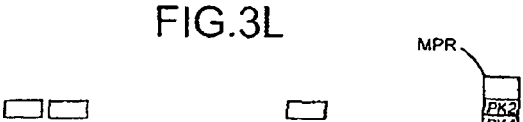
Figure 3O:
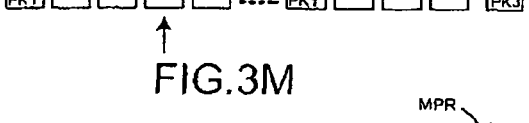
Figure 3P:
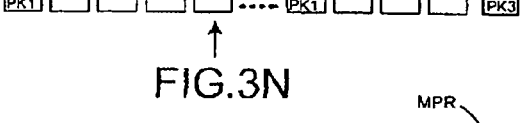

Such a transmitted packet recovery method is illustrated by the sequence of FIGS. 3A-3P. Below, the suffixes a and b distinguishing between the first and second replicas of each packet are omitted. The CRDSA frame, transposed into the baseband, sampled and stored in a memory of a receiver equipment, is scanned sequentially several times (the arrow at the bottom of the frame indicates the packet being examined at a given time). Assume, for the moment with no further explanation, that it is possible to distinguish an uncorrupted packet from a stack of packets resulting from a collision (e.g. PK2+PK3) and that, if a packet is known, it is possible to "subtract" it from such a stack, for example to recover PK2 knowing (PK2+PK3) and PK3.

In the first step, shown in FIG. 3A, the time slot containing the stacked packets PK1 and PK2 is examined; since it is a packet that has not been received correctly, no operation is executed. The same thing happens on examining the next time slot (FIG. 3B). The third time slot (FIG. 3C) does not contain any packets and is therefore ignored. In the fourth step (FIG. 3D), one of the two replicas of the packet PK3 is identified as having been received correctly, with no collisions; the packet PK3 is therefore stored in a received packet memory location MPR provided for this purpose. What distinguishes the method of the invention from the prior art DSA technique is the fact that using an interference cancellation method enables the packet PK3 to be "subtracted" from the second time slot, leaving therein only the packet PK1. Scanning of the CRDSA frame continues: FIG. 3F shows the examination of a time slot containing the stacked packets PK1 and PK4 and FIG. 3G the examination of an empty slot. During the next step (FIG. 3H), the packet PK4 is recovered, stored in the memory MPR, and subtracted from the stacked PK1 and PK4 (FIG. 3I). Then, after reaching the last slot, the scanning of the frame starts over from the beginning (FIG. 3J). In the step shown in FIG. 3K, the same time slot already considered in FIG. 3B is examined, but this time the "access conflict" between the packets PK2 and PK3 has been resolved by the interference cancellation method referred to above. The last event worthy of interest is represented in FIGS. 3O and 3P, with the packet PK1 also being recovered and stored in turn in the memory MPR.

Figure 4B:
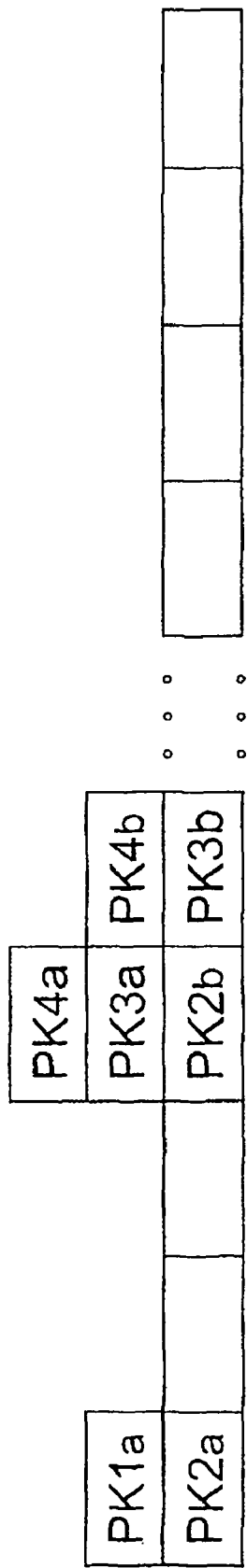
FIGS. 4A and 4B show two situations in which the method of the invention is unable to resolve an access conflict.
Figure 4A:
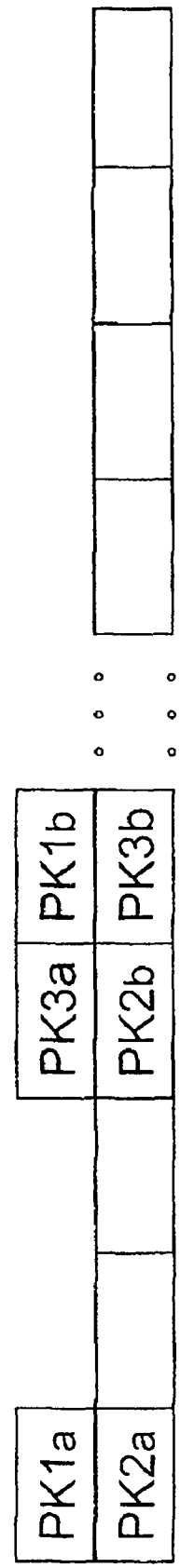

In the example considered above, all the packets could be recovered. It is obvious that this is not always the case and that there are "inextricable" situations in which access conflicts cannot be resolved: FIGS. 4A and 4B show two examples of such a situation. In this case, all that remains is to retransmit the lost packets, as in any Aloha type method. It is nevertheless clear that the method of the invention achieves a very significant improvement in efficiency, on average.

Until now it has simply been assumed that a recovery equipment of the invention can identify packets that have been received without collisions and execute the interference cancellation method. To show how this is possible, it is necessary to refer specifically to the technical characteristics of a particular communications system. It must nevertheless be borne in mind that the invention is more general in scope and is not limited to any such particular system. The implementation of the invention described below does not correspond exactly to that shown in FIGS. 3A-3P, but is based on the same general inventive concept.

In the conventional way, for each satellite terminal (and thus for each user, as the main area of interest is that of residential users each having their own terminal), the packets of information are first stored in a buffer and segmented into medium access control (MAC) packets of constant size. In particular, although this choice is arbitrary, packets the size of an ATM cell are considered here. The MAC packets are then coded, modulated and transmitted in a time slot n of a frame m that corresponds to a carrier of frequency $\omega_m$ on the basis of the burst time plan (BTP) that is broadcast to all the terminals via the downlink signaling channel (in this regard see the ETSI document EN 301 790 V1.3.1 cited above), and which is therefore common to all users.

In fact, as in the DSA method, two replicas of each packet are generated and transmitted with respective random offsets. In addition to payload data, each transmitted packet contains guard symbols and a preamble whose content and function are explained later. The payload data, represented by a total of $N_{pay}$ symbols, is in turn divided into $N_{pay-u}$ useful payload symbols representing the information to be transmitted and $N_{pay-s}$ signaling symbols indicating the position of the "twin" replica within the time slot. The payload data (useful payload data and signaling information) is protected by a forward error correction (FEC) code with a threshold signal-to-noise plus interference ratio (SNIR) $[E_s/(N_0+I_0)]_{req}$, where $E_s$, $N_0$ and $I_0$ respectively represent the power of the signal, the noise and the interference. Assuming Gaussian interference, if $[E_s/(N_0+I_0)] < [E_s/(N_0+I_0)]_{req}$ at the receiver equipment of the gateway, it may be considered that the payload data information has been recovered and the preamble detected correctly; a code redundancy check (CRC) verifies that the payload data has in fact been decoded without errors.

The preamble, which is the same for both twin replicas of each packet, consists of a pseudo-random bit sequence of length $N_{pre-a}$ selected at random from a family $S_{PR}$ of sequences whose size (number of sequences) is of the order of $N_{pre-a}$. The family $S_{PR}$ must have good auto-correlation and cross-correlation properties, which means that the sequences must be almost mutually orthogonal and have respective narrow auto-correlation peaks. Appropriate families are Gold Codes and extended length Gold Codes, for example. On this topic see the paper by R. Gold "Optimal Binary Sequences for Spread Spectrum Multiplexing" IEEE Trans. on Inf. Theory, vol. 13, issue 4, Oct. 1967, pages 796-807, and that by J. A. L. Incio, F. Cercas, J. A. B. Gerald and M. D. Ortigueira, "Performance Analysis of TCH Codes and other New PN Even Balanced (PN-EB) Codes Suitable for High Processing Gain DS-SS Systems", Actas da II Conferencia de Telecomunicaes, Conftele99, Sesimbra, Portugal, April 1999, pages 342-346.

In conventional (D)SA protocols, one and the same preamble is used for all the packets sent. In the conventional way, that preamble identifies the start of each packet and is used to estimate the phase, time, and frequency shifts of the carrier (channel estimation), that is used to demodulate the payload data. In contrast, in this implementation of the invention, each of the packets sent in the same time slot is characterized by a different preamble. In practice, since the preambles are assigned to the packets independently of one another, it is possible for the same sequence to be assigned to two packets transmitted in the same time slot. However, because the auto-correlation peaks of said sequences are very narrow, this has no serious consequences except in the situation of a collision between two packets having the same preamble and a time difference less than the duration of one symbol. The effects of such a "preamble collision" are considered below.

In the present communications system, a mixed modulation technique is adopted: QPSK modulation for the "payload data" symbols and binary (±1) BPSK modulation for the symbols of the preamble, and the guard symbols are characterized by a null amplitude. This is a common choice in the TDMA modulation technique, but generalizing it to other techniques, in particular to other phase and amplitude modulation techniques (for example QPSK modulation for all the symbols) will be evident to the person skilled in the art.

For simplicity, it is assumed that all the delays suffered by the signals are integer multiples of the duration of a symbol. Generalization to delays of any length does not give rise to any theoretical difficulty.

The discrete signal $\bar{s}[i,n,q]$ sent by the satellite terminal #i in the time slot #n to transmit the packet #q is therefore written:

$$\bar{s}[i,n,q] = \sqrt{P_{Tx}}[i]\{\bar{s}_{pre}[i,q], \bar{s}_{pay}[i,q], \bar{s}_{guard}\} \quad [1]$$

in which:

$$\bar{s}_{pre}[i,q] = \{c_1[i,q], c_2[i,q], \ldots, c_{N_{pre-a}}[i,q]\} \quad [2]$$

$$\bar{s}_{pay}[i,q] = \frac{1}{\sqrt{2}} \quad [3]$$

$$\{d_{p,1}[i,n,q] + jd_{q,1}[i,n,q], \ldots, d_{p,N_{pay}}[i,n,q] + jd_{q,N_{pay}}[i,n,q]\}$$

$$\bar{s}_{guard}[i,q] = \{0, 0, \ldots, 0\}(N_{guard} \text{ elements}) \quad [4]$$

In the above expressions, $c_l[i,q]$ is the $l^{th}$ element of the sequence of the preamble, $d_{p,l}[i,n,q]$ and $d_{q,l}[i,n,q]$ are respectively the $l^{th}$ in-phase and quadrature elements of the sequence of payload data, comprising "effective payload data" and "signaling" symbols. The terms $c_l[i,q]$, $d_{p,l}[i,n,q]$ and $d_{q,l}[i,n,q]$ can take only the values +1 and −1. $P_{Tx}$ represents the power of the transmitted signal, proportional to the square of its amplitude.

The signal received at the gateway is given by the sum of the individual signals transmitted by the various satellite terminals #1-$N_{ST}$ in the time slot #n. If the delay, amplitude, and phase of the signals are considered to remain constant throughout the duration of a TDMA time slot, which appears to be a reasonable assumption, the discrete signal obtained by coherent demodulation and sampling of said signal may be written:

$$\bar{r}[n] = \sum_{i=1}^{N_{ST}} \delta[i,n]L[i,n]\bar{s}[i,n,q]z^{-D[i,n]}\exp\{j(\phi[i,n]+\Delta\omega[i,n]t[n])\} + \bar{w}[n] \quad [5]$$

In equation [5]:

$\delta[i,n]$ has the value 1 if the satellite terminal #i is active during the time slot #n; otherwise it has the value 0;

$L[i,n]$ is the attenuation at the gateway of the signal transmitted by the satellite terminal #i during the time slot #n, assumed constant throughout the duration of said time slot;

$\bar{s}[i,n,q]$ is the signal expressed by the equation [1];

$z^{-D[i,n]}$ is the delay operator associated with a differential delay $D[i,n]$ of the satellite terminal #i during the time slot #n, expressed as a number of symbols and assumed to have an integer value from 0 to $N_{guard}$; the effect of the operator $z^{-D[i,n]}$ is to shift the elements of the vector $\bar{s}[i,n,q]$, $D[i,n]$ positions towards the right;

$\phi[i,n]$ and $\Delta w[i,n]$ respectively represent the phase shift and the frequency shift relative to a local oscillator of the receiver of the satellite terminal #i during the time slot #n;

$t[n]$ represents the time corresponding to the time slot #n; it is considered here that the frequency error is sufficiently small to induce a negligible phase variation during a time slot: $\Delta\omega[i,n]t \approx \Delta\omega[i,n]t[n]$=constant for the time slot #n; and $\bar{w}[n]$ is a vector of $N_{slot}$ elements, each representing symmetrical circular Gaussian white noise of variance $\sigma_w^2$.

The preamble and the payload data for the terminal #i are also defined during the time slot #n actually received by the gateway as sub-vectors of the vector $\bar{r}[n]$:

$$\bar{r}_{pre}[n,i] = \lfloor r(D[i,n]+1), r(D[i,n]+2), \ldots r(D[i,n]+N_{pre-a}) \rfloor \quad [6]$$

$$\bar{r}_{pay}[n,i] = \lfloor r(D[i,n]+N_{pre-a}+1), \ldots r(D[i,n]+N_{pre-a}+N_{pay}) \rfloor \quad [7]$$

Note immediately that equations [6] and [7] take account of the effect of attenuation, noise, and collisions on the signals sent by the satellite terminals. In particular, the number of collisions in the time slot #n is given by the equation:

$$N_{coll}[n] = \sum_{i=1}^{N_{ST}} \delta[i,n] - 1 \quad [8]$$

For the purposes of analyzing the contribution of the invention, it is considered that the power $P_{Tx}[i]$ transmitted by the terminal #i is constant, whereas the power received at the gateway during the time slot #n, $P_{Rx}[i,n]=L^2[i,n]P_{Tx}[i]$, is a random variable that follows a logarithmico-normal distribution characterized by a mean value $\bar{P}_{Rx}[i,n]$ and by a standard deviation (in dB) $\sigma_{P_{Rx}[i]}$. The amplitude received at the gateway is defined by the equation:

$$A_{Rx}[i,n] = \sqrt{P_{Rx}[i,n]} = L[i,n]\sqrt{P_{Tx}[i]} \quad [9]$$

At the receiver, the received radio-frequency signal is transposed to an intermediate frequency signal by means of a local oscillator, sampled, and quantized, following which the various carriers are separated by a digital multiplexer. The samples constituting an RA frame are therefore stored in a digital memory and read sequentially. The content of that memory is then processed iteratively to extract the information contained in the received packets.

In a first step, a search for all the $S_{PR}$ possible preambles is carried out in parallel, using a technique routinely employed in code division multiple access (CDMA) systems (see for example R. de Gaudenzi, F. Giannetti and M. Luise "Signal Recognition and Signature Code Acquisition in CDMA receivers for Mobile Communications", IEEE Trans. on Veh. Tech., vol. 47, No. 1, February 1998). As the satellite terminals are approximately synchronized with each other, the search can be limited to the guard periods around the nominal location of the preamble within each time slot. When codes are identified, they are used in the conventional way to estimate the amplitude parameter A, the frequency shift parameter $\Delta\omega$, the phase parameter $\phi$, and the delay parameter $\tau$ (which parameter $\tau$ corresponds to the parameter D of equation [5], but the simplified assumption that the differential delay is expressed by an integer number of symbols has been dropped), following which the payload data is decoded and the code redundancy check (CRC) is effected. If the result of that check is positive, it is considered that a "clean" replica has been recovered, i.e. a replica that has not suffered any destructive collision. If $\hat{s}_{pay}$ denotes the bit sequence corresponding to the payload data as decoded, and $\bar{s}_{pay}$ the sequence actually transmitted, it may be stated that $\hat{s}_{pay}=\bar{s}_{pay}$. The signaling information contained in the payload data further makes it possible to identify the time slot in which the twin replica of each clean replica was transmitted.

Following this first step, there is therefore available a set of $N_{rec}(1)$ packets recovered correctly (the digit "1" indicates packets recovered during the first iteration), identified by the indices $\bar{q}=\lfloor q_1, q_2, \ldots, q_{N_{rec}(1)} \rfloor$, corresponding to the satellite terminals $\bar{i}=\lfloor i_1, i_2, \ldots, i_{N_{rec}(1)} \rfloor$ and having clean replicas located in the time slots $\bar{n}=\lfloor n_1, n_2, \ldots, n_{N_{rec}(1)} \rfloor$ and whose "dirty" (corrupted by collisions) twin replicas are situated in the time slots $\bar{n}^r=\lfloor n_1^r, n_2^r, \ldots, n_{N_{rec}(1)}^r \rfloor$. Of course, it is possible for both replicas of the same packet to be "clean": in this case, one of the two replicas may simply be ignored and it is not necessary to execute the interference cancellation algorithm. There are considered below only "dirty" replicas of "clean" packets recovered during the preceding step.

It is reasonable to consider that the amplitude, frequency shift, and time shift of the two twin replicas of each packet are the same, because said replicas are transmitted with a relatively modest time shift:

$$\hat{A}[i_k, n_k^r] \approx \hat{A}[i_k, n_k]; \Delta\hat{\omega}[i_k, n_k^r] \approx \Delta\hat{\omega}[i_k, n_k]; \hat{\tau}[i_k, n_k^r] \approx \hat{\tau}[i_k, n_k],$$

where $\hat{A}$, $\Delta\hat{\omega}$ and $\hat{\tau}$ are estimated amplitude, frequency shift, and time shift values, respectively.

It follows that the values estimated from the preamble of each "clean" replica may be used to "regenerate" the packet at complex baseband level. The regenerated signal may be subtracted from the samples $\bar{r}[n_k^r]$ of the time slots $\bar{n}^r=\lfloor n_1^r, n_2^r, \ldots, n_{N_{rec}(1)}^r \rfloor$ to cancel the interference.

Although this is not essential, amplitude estimation may be enhanced by using not only the preamble of the clean replica but also its payload data, which has been decoded correctly prior to this:

$$\hat{A}[i_k, n_k^r] \approx \hat{A}[i_k, n_k] \approx \frac{1}{N_{pay}}[\bar{r}_{pay}[n_k, i_k] \cdot \hat{s}_{pay}[n_k, i_k, q_k]] \quad [10]$$

Amplitudes, frequency shifts, and time shifts are not sufficient for complete regeneration of "dirty" replicas: the phase must also be determined. However, because of the high-frequency phase noise that might affect the local oscillators of the satellite terminals and/or the gateway, it appears reasonable to consider that there is no correlation between the phases of two twin replicas of the same packet. Consequently, it is not possible to use the estimate of the phase $\hat{\phi}[i_k,n_k]$ calculated from the "clean" replica to cancel the "dirty" twin replica. The phase must therefore be estimated directly from said dirty replica, using the known bit sequence of the preamble, obtained by decoding the clean replica. The estimate of the phase of the dirty replica of the packet sent by the terminal $i_k$ in the time slot $n_k$ is given by the argument of the correlation between the sequence of the preamble and the samples of said dirty replica corresponding to the symbols of the preamble:

$$\hat{\phi}[i_k,n_k^r] \approx \arg\{\bar{r}_{pre}[n_k^r,i_k] \cdot \bar{s}^*_{pre}[i_k,q_k]^T\} \quad [11]$$

Equation 11 explains why, in the implementation of the invention considered here, it is necessary to use quasi-orthogonal preambles for the various packets: this circumvents the interference and recovers correctly the phase of each "dirty" replica, which would not be possible if the same sequence were used for all the preambles, as in the prior art methods. However, as is demonstrated below, an alternative implementation of the invention uses the same preamble for all the packets transmitted.

If the argument operator in equation [11] is replaced by the modulus operator, an estimate of the amplitude of the dirty replica is obtained. However, as a general rule, this estimate is not as good as that computed from the clean twin replica, and is therefore not used in the implementation of the invention considered here.

At this point, estimates of the amplitude, frequency shift, phase, and delay of the dirty replica are available, and its content is known perfectly; it can therefore be cancelled from the time slot $n_k$:

$$\bar{r}[n_k^r] \approx \bar{r}[n_k^r] - \hat{A}[i_k,n_k^r]\exp[j(\hat{\phi}[i_k,n_k^r]+$$
$$\Delta_{\omega[i_k,n_k^r]}t[n_k^r])][\bar{s}_{pre}[i_k,q_k],\bar{s}_{pay}[i_k,q_k]] \quad [12]$$

For example, if said time slot initially contained a signal that was impossible to decode correctly as a result of first and second packets being superposed, subtracting the contribution of the first packet recovers the content of the second.

After all the "dirty" replicas of the correctly-received packets have been subtracted, the samples $\bar{r}[n_k]$ corresponding to the clean packets may be deleted from the memory and the algorithm may resume. New packets that were previously corrupted by collisions might now be decoded correctly and used in turn to cancel other interference, and this process can continue in this fashion until all the packets have been recovered or a maximum number of iterations $N_{iter}^{max}$ has been reached.

Figure 5A:
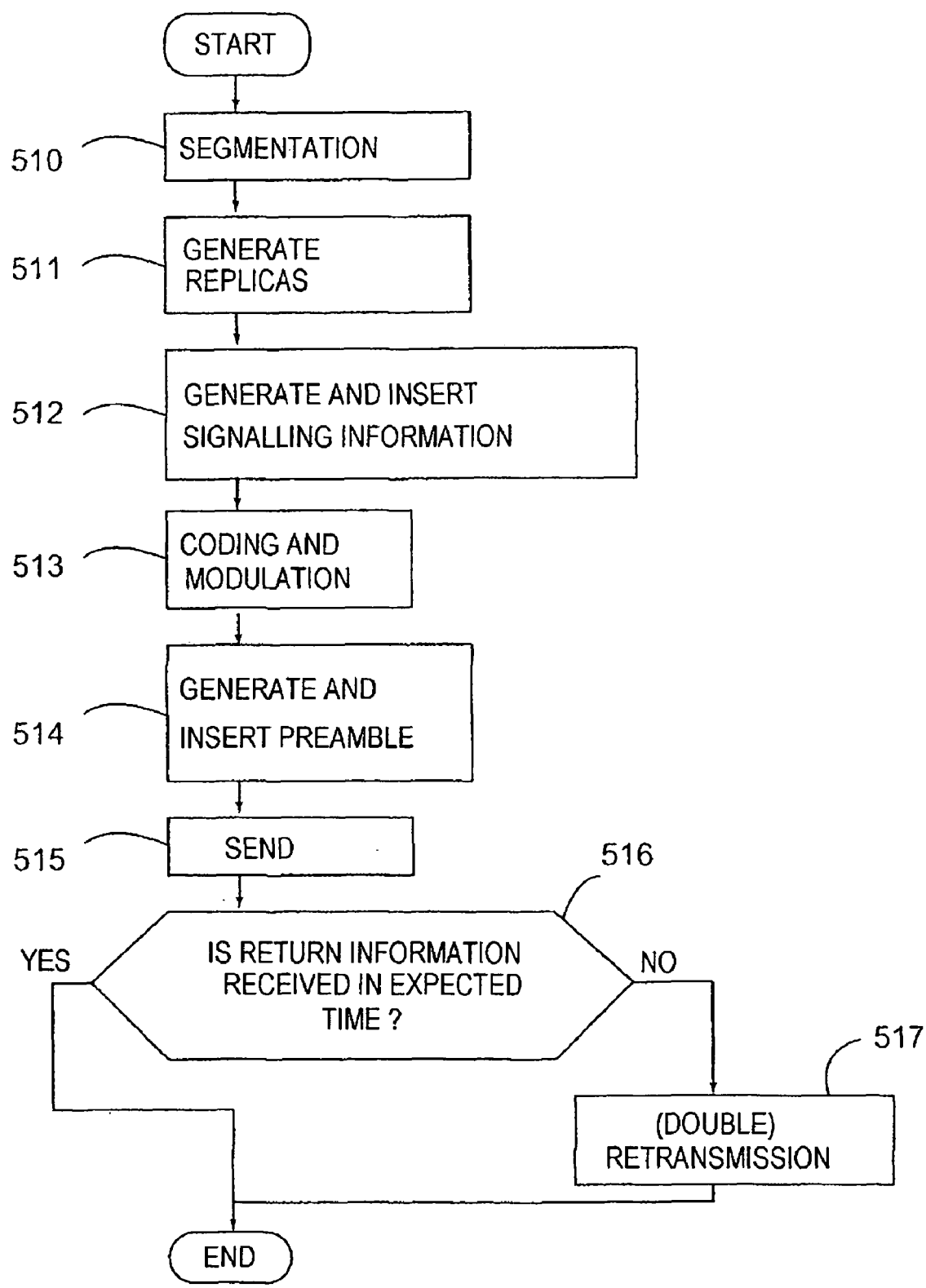
FIGS. 5A and 5B are flowcharts respectively showing a transmission method and a receiver packet recovery method conforming to a second implementation of the invention.
Figure 5B:
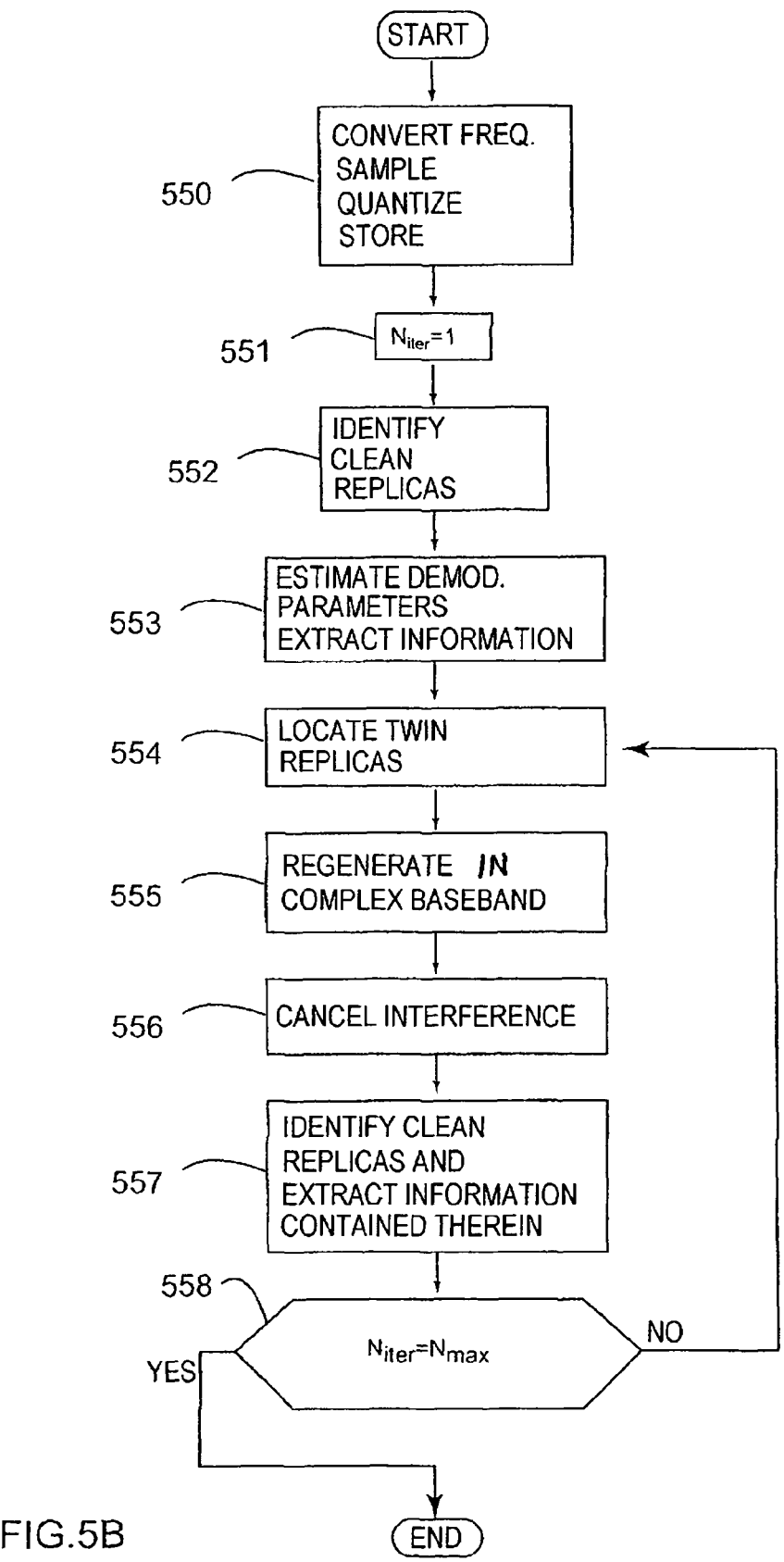

The FIG. 5A and FIG. 5B flowcharts provide overviews of the processes described in detail above for transmitting packets and for recovering packets on reception.

The FIG. 5A transmission method includes a first step 510 of segmenting data to be transmitted into packets of constant size, for example with the dimensions of an ATM cell.

Then, in step 511, replicas of each packet are generated (preferably two replicas of each packet).

Step 512 comprises generating and inserting into each replica signaling information for locating the other replica (or, where applicable, the other replicas) of the same packet in the time domain. For example, this signaling information may take the form of an identifier of the time slot of a TDMA frame in which said other replica will be transmitted, or a measurement of the time shift between the replicas.

Then (step 513) each replica, also containing the signaling information, is coded using an error corrector code, preferably an error corrector code with no return channel, and modulated, preferably by a phase and amplitude modulation technique such as the QPSK technique.

Step 514 comprises generating and inserting a preamble that is the same for each replica of the same packet but differs from one packet to another. This preamble consists of a pseudo-random bit sequence selected from an appropriate family, for example a family of Gold codes or length-extended Gold codes. The preamble is typically in the form of a bipolar or BPSK sequence of symbols.

Sending step 515 comprises conventional filtering and frequency conversion operations. It is essential that sending be carried out in a manner that conforms to the signaling information generated in the step 512. Accordingly, if said signaling information takes the form of a time slot identifier, sending must occur exactly in the indicated time slot. However, if the signaling information comprises only a time shift measurement, the time at which each replica is sent is of little importance, provided that the correct time difference is maintained. The replicas may be generated directly with the correct time shift between them in step 511 or they may be stored in a buffer memory just before sending and extracted therefrom at the appropriate times.

The transmission method could terminate at this point, but it is generally preferable to provide a mechanism for retransmitting any packets that might be lost, in particular because of access conflicts. For this reason, if no return information is received by the sender within some particular time period (step 516), the packet is deemed to be lost and is retransmitted (step 517). As demonstrated below, retransmission is preferably effected twice, the second retransmission taking place independently of the reception (or non-reception) of the return information corresponding to the first retransmission.

It is important to specify that the return information does not necessarily take the form of an "acknowledgement" sent by the receiver station to users; it could be implicit. For example, if the packet transmitted constitutes a service request, for example a request to assign transmission capacity, its execution or non-execution may be considered as return information indicating that said packet has been received correctly or not.

In the FIG. 5B flowchart, the first step 550 of the receiver packet recovery method comprises preliminary operations of converting to an intermediate frequency, sampling, quantizing, and storing in memory the signals received by a gateway.

In step 551, an iteration counter is initialized to $N_{iter}=1$.

Step 552 comprises identifying clean replicas, for example by effecting, preferably in parallel, calculations of the correlation between the signals received and the pseudo-random bit sequences from which the preambles were selected.

In step 553, and again using the preamble, the parameters necessary for coherent demodulation of the clean replicas are estimated: amplitude, phase shift, frequency shift and delay. Said clean packets are then demodulated and decoded and the information contained in the payload data is extracted.

Steps 550, 552, and 553 are common to the invention and to conventional (D)SA methods, except that a plurality of preambles are searched for in parallel during step 553. A prior art method would terminate at this point.

In step 554 the signaling information extracted from the "clean" replicas identified in the step 552 is used to locate the corresponding "dirty" twin replicas in the time domain.

Step 555 comprises reconstructing at complex baseband level the "dirty" replicas identified in the preceding step. This is done using the amplitude, frequency, and delay parameters estimated in the step 553 and a phase parameter determined directly from the portion of the received signal containing the dirty replica to be reconstructed.

In step 556 each replica reconstructed at complex baseband level is subtracted from the received signal, to "cancel" the dirty replica located in the step 554.

Accordingly, replicas that were previously corrupted by destructive collisions can now be identified and the information contained therein extracted. This is done during a step 557 substantially identical to the steps 552 and 553 described above. If the maximum number of iterations $N_{max}$ has not yet been reached (test step 558), the counter $N_{iter}$ is incremented and the method resumes from the step 554.

As is shown below, to obtain good performance in terms of packet loss probability and mean transmission delay, it is preferable for the normalized loading G of the channel not to exceed 0.4. This means that on average 0.4 data packets are transmitted per time slot; and since each packet is transmitted in the form of two replicas, this normalized loading corresponds in fact to a "physical loading" of 0.8 replicas per time slot. There is therefore a need for a method of controlling the flow of data able to maintain the loading of the channel at a value around an optimum value. Such a method should preferably be decentralized, i.e. each satellite terminal should be able to adjust its own transmission throughput independently of the others.

It is considered that each satellite terminal i transmits on average one packet every $N_i$ RA frames; it is then said to have a transmission period $N_i$. As shown in the FIG. 6 flowchart, the gateway GW measures the loading of the channel and transmits regularly, every $N_p$ frames, a congestion report RC that is received by all the terminals $ST_i$ (step 610). If the report indicates that the normalized loading G of the channel exceeds a threshold value $G_{th}$ (step 611), each satellite terminal increases its transmission period by one unit, with a certain probability $P_i^{up}$ (steps 612 and 613). The probability $P_i^{up}$ is preferably inversely proportional to the period $N_i$ and has the values 0 if $N_i = N_{max}$. For example, in the step 612 we make take:

$$P_i^{up} = \begin{cases} 0 & si\ N_i = N_{max} \\ \frac{1}{2^{N_i}} & si\ N_i < N_{max} \end{cases} \quad [13]$$

In the same way, if $G < G_{th}$ (614), each satellite terminal will reduce its transmission period by one unit with a certain probability $P_i^{down}$ $P_i^{up}$ (steps 615 and 616), preferably inversely proportional to the period $N_i$ and zero when $N_i = 1$. For example, in the step 615 we may take:

$$P_i^{down} = \begin{cases} 0 & si\ N_i = 1 \\ \frac{1}{2^{N_{max}+1-N_i}} & si\ N_i > 1 \end{cases} \quad [14]$$

To avoid overly frequent modification of the transmission period, it is equally possible to select different threshold values to trigger period increases and decreases. Furthermore, the satellite terminals can also increase or decrease their transmission period by more than one unit at a time.

The CRDSA method of the invention may advantageously be combined with a DA protocol for effective management of different traffic profiles, for example traffic whose characteristics may vary unpredictably. The resulting method is called the CRDSA-DA method.

Internet Protocol (IP) packets for transmission by a satellite terminal are received by the terminal in the medium access control (MAC) layer and they are segmented into packets having the dimensions of asynchronous transfer mode (ATM) cells, which is 53 bytes. These packets are then stored in a first-in/first-out (FIFO) queue; for simplicity, only one queue is considered, but it is possible to generalize this concept to the situation of separate queues for packets with different priority levels. If the file contains a relatively large number of packets to be transmitted, it is advantageous to effect a channel capacity assignment request and to transmit the data using a DA method. This is because the greater efficiency of such a method over RA transmission, even in accordance with the invention, compensates for the waiting time to obtain said capacity assignment. However, if the file contains little data, it is advantageous to transmit it directly by an RA method, and in particular by the CRDSA method.

To be more precise, at a given time, the queue of a satellite terminal contains Q packets and capacity is reserved for K packets. The first K packets of the queue will be transmitted by a DA method, using the capacity that has already been reserved; the terminal must select one of two options: either to transmit the remaining Q−K packets by the CRDSA method or to effect another capacity reservation request in order to transmit them using a DA method.

Figures 6, 7:
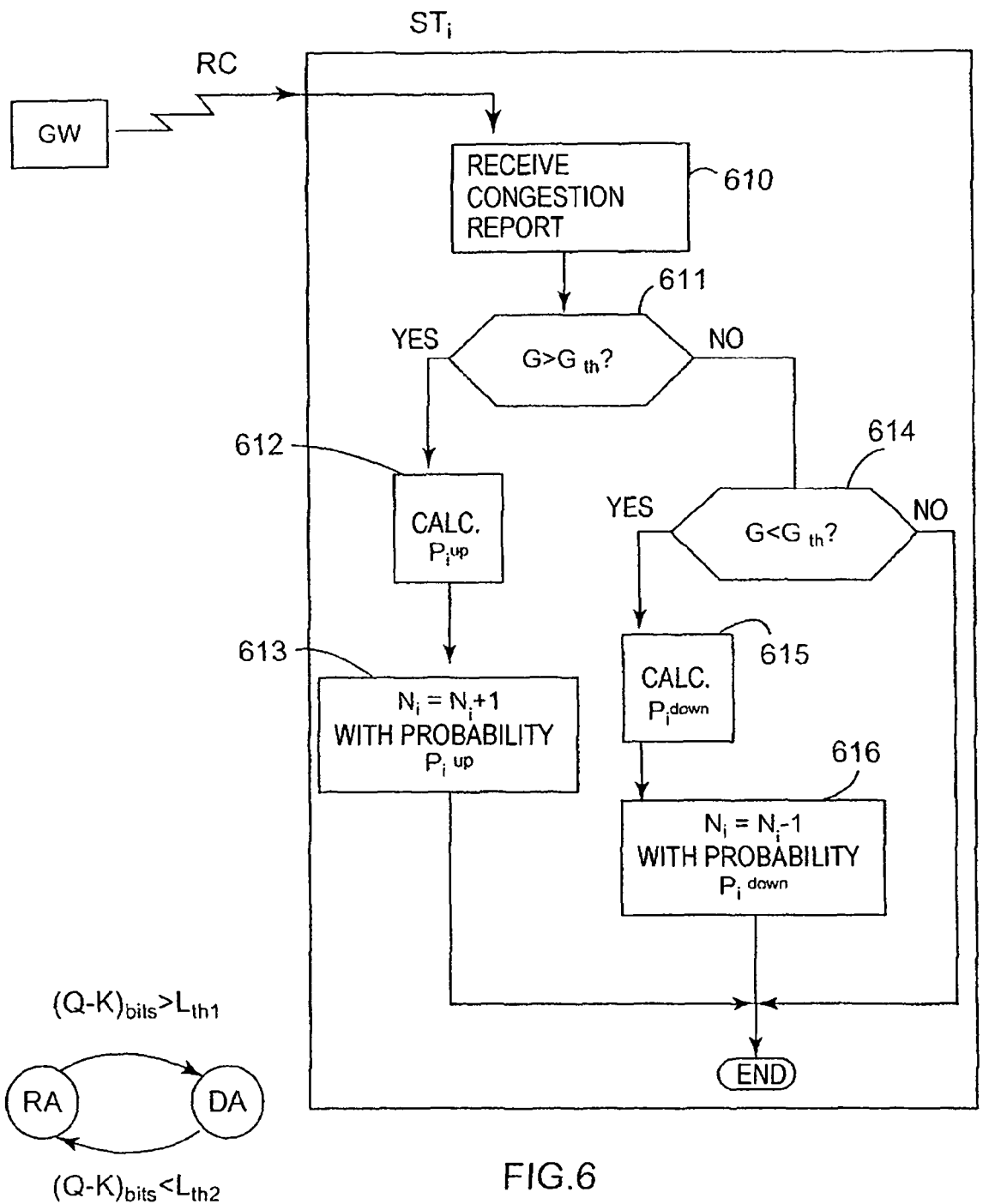
FIG. 6 is a flowchart showing a decentralized flow control method used in a third implementation of the invention.
FIG. 7 is a state diagram showing an implementation of the CRDSA-DA protocol of the invention.

As shown in FIG. 7, at any given time, the satellite terminal is either in an RA mode, in which case it transmits using the CRDSA method of the invention, or in a DA mode, in which case it effects capacity requests in order to transmit using a demand assignment method. The content in bits of the queue excluding packets for which capacity has already been reserved, denoted $(Q-K)_{bits}$, is compared to two threshold values, $L_{th1}$ and $L_{th2} < L_{th1}$. If the terminal is in an RA mode and $(Q-K)_{bits}$ falls below $L_{th1}$, it switches to the DA mode. Conversely, if $(Q-K)_{bits}$ falls below $L_{th2}$ when the terminal is in a DA mode, the terminal switches to the RA mode (but the K packets for which capacity has been reserved will nevertheless be transmitted by the DA method).

The threshold values $L_{th1}$ and $L_{th2}$ may be determined as a function of the actual throughput of the RA channel, which is given by the equation:

$$R_{b,RA} = \frac{N_{frames}^{RA} B_{cell}}{T_{SF} N_i} \quad [15]$$

where:
$N_{frames}^{RA}$ is the number of RA frames per superframe;
$B_{cell}$ is the number of information bits transmitted in each time slot;
$T_{SF}$ is the duration (in seconds) of a superframe; and
$N_i$ is the transmission period of the satellite terminal #i in the RA mode.

We set:

$$L_{th1} = \lambda_1 R_{b,RA}$$

$$L_{th2} = \lambda_2 R_{b,RA} \quad [16]$$

in which the parameters $\lambda_1$ and $\lambda_2 < \lambda_1$ respectively represent the mean transmission delay in DA mode and in RA mode. This means that, if $(Q-K)_{bits} > L_{th1}$ defined by equation [16], the time necessary to empty the RA mode queue will be greater than the time that will be necessary, on average, for a DA transmission. The opposite situation arises if $(Q-K)_{bits} < L_{th2}$. The values that $\lambda_1$ and $\lambda_2$ actually take cannot be determined a priori, since they depend on the concrete system concerned. For example, in the situation illustrated by FIGS. 10L and 10M, appropriate values of these parameters are: $\lambda_1=1.1$ seconds (s) and $\lambda_2=0.1$ s. Where appropriate, $\lambda_1$ and $\lambda_2$ can be determined adaptively as a function of the mean transmission delays measured in DA mode and RA mode, respectively.

With various implementations of media access control methods of the invention described above, there follows a description of a transmitter equipment ("modulator") and a receiver equipment ("demodulator") enabling implementation of the transmission method and the method of recovering packets on reception described above with reference to FIGS. 5A and 5B, respectively.

Figure 8:
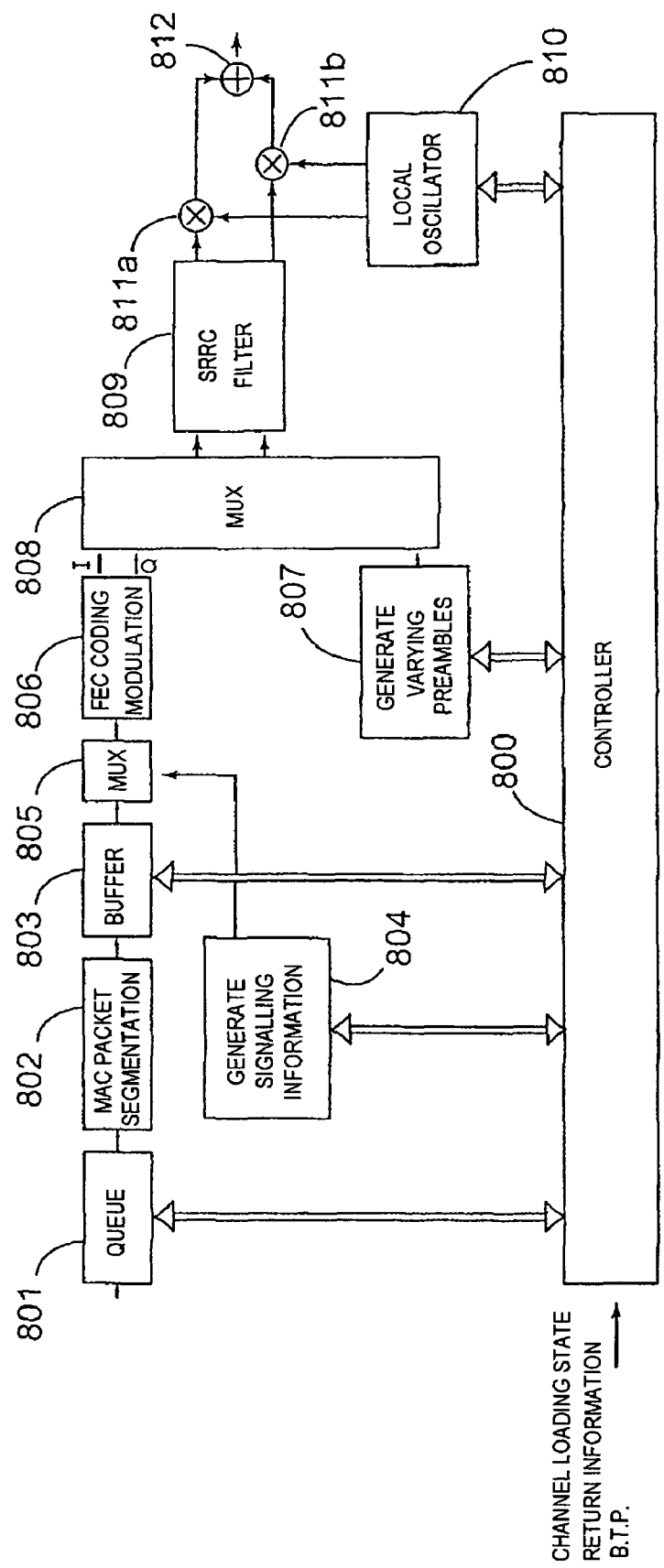
FIG. 8 is a functional diagram of a transmitter equipment adapted to use the method illustrated by the FIG. 5A flowchart.

FIG. 8 is a functional diagram of an implementation of a CRDSA modulator of the invention. Such a modulator is generally intended for use in satellite terminals of residential users of a communications system.

The data packets to be transmitted are first stored in a queue 801. They are extracted therefrom in accordance with the FIFO principle (first in, first out) and sent to a block 802 for segmenting them into MAC packets, where they are segmented into MAC packets of fixed size (for example ATM cells or MPEG packets) using prior art encapsulating techniques. The MAC packets are then stored in a buffer 803 to absorb data arriving at a higher throughput than the throughput transmitted by the satellite terminal. Each packet stored in the buffer 803 is extracted from it twice (twin replicas), under the control of a modulator controller 800. The modulator controller 800 and the buffer 803 thereby together constitute a device for generating at least two replicas of each packet to be transmitted. A device 804 for generating signaling information produces a bit sequence for each replica indicating the position of the corresponding twin replica in the RA frame. The "effective payload data" extracted from the buffer 803 and the signaling information generated by the block 804 are combined by a first multiplexer 805 to reconstitute the binary sequence representing the payload data of the replica. The payload data is then protected by a forward error correction code (FEC) and converted into a QPSK symbol sequence (block 806). The two arrows outgoing from the functional block 806 represent the two partial bit sequences $d_{p,l}$ and $d_{q,l}$ for modulating the in-phase component (I) and the quadrature component (Q), respectively, of the carrier. A preamble generator device 807 driven by the controller 800 generates a pseudo-random bit sequence belonging to the family $S_{PR}$ and intended to constitute the preamble of the packet. Payload data and preamble are then assembled by a second multiplexer 808 (also called a "burst multiplexer"), which also allocates the guard symbols $\bar{s}_{guard}$. The square-root raised cosine (SRRC) filter 809 generates pulses of finite bandwidth which, by means of the mixers 811a and 811b, modulate said in-phase component (I) and quadrature component (Q) of the intermediate frequency carrier generated by the local oscillator 810. The two modulated components are summed by the adder block 812 and converted to the analog format at the output of the modulator (digital-analog converter not shown). The analog signal obtained in this way can therefore be converted to a radio-frequency signal to be transmitted by the satellite terminal.

The modulator controller 800 also constitutes a flow control device which receives information about the loading of the shared transmission channel and modifies the transmission period of the modulator as a function of said loading information. It also constitutes a retransmission device which checks for return information indicating that a transmitted packet has been received correctly and, if necessary, triggers retransmission of said packet.

Most of the functional blocks that constitute the CRDSA modulator of FIG. 8 are also comprised in a prior art (D)SA modulator, with the same relative dispositions and to accomplish the same functions. However, the two blocks 804 and 805 have no equivalent in a prior art modulator because the introduction of signaling information constitutes a novel feature of the invention. The block 807 is modified compared to the prior art modulators in that they use only one preamble for all the packets transmitted, instead of different preambles selected at random from a family of quasi-orthogonal bit sequences. Of course, the operation of the controller 800 is also different compared to a prior art modulator, but in general this can be achieved without any hardware modification of the device, merely by operating on software components.

Figure 9:
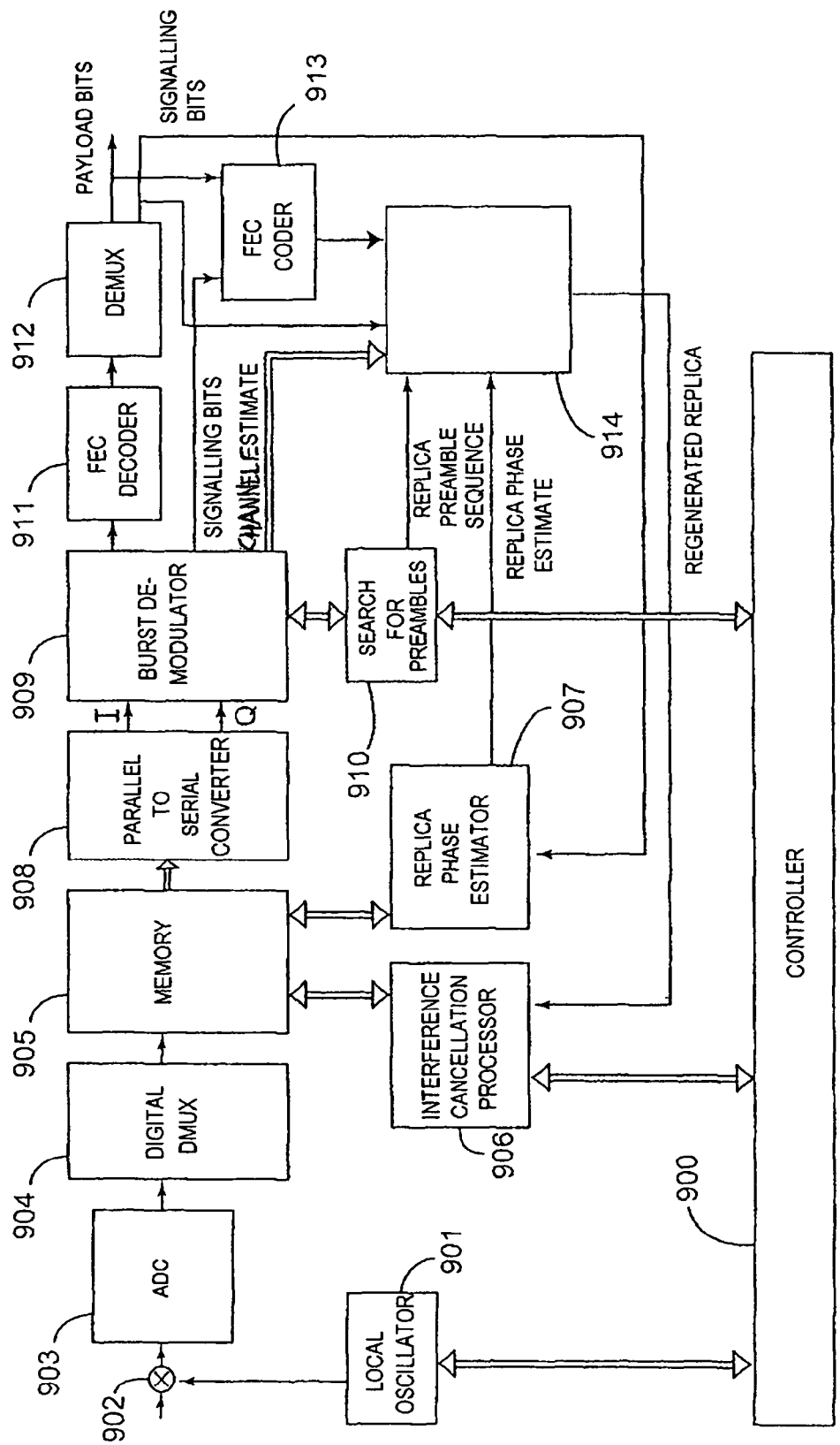
FIG. 9 is a functional diagram of a receiver equipment adapted to use the method illustrated by the FIG. 5B flowchart.

FIG. 9 is a functional diagram of an implementation of a CRDSA modulator of the invention, generally intended for use in the gateways. Such a modulator may also be used onboard a regenerator satellite.

The received MF-TDMA signal is first transposed to an intermediate frequency IF (local oscillator 901 and mixer 902) and then converted to digital format (analog/digital converter 903). A digital demultiplexer 904 separates the various carriers constituting a superframe; only the frame(s) assigned to RA transmission is/are considered below. The complex samples constituting the MF-TDMA digital signal are stored in a memory 905 and extracted therefrom in a sequential order corresponding to the individual frames by a parallel/serial converter 908 and passed to a burst demodulator block 909.

The demodulator block 909 uses a device for identifying "clean" replicas taking the form of a device 910 for searching for preambles in order to identify the replicas in said digital signal that can be demodulated and decoded correctly because they have not been corrupted by destructive collisions. The preamble search device preferably searches in parallel all the pseudo-random bit sequences that may be used as preambles.

The demodulator block 909 estimates channel parameters, more particularly amplitude, frequency, phase, and delay parameters of the replicas identified, and demodulates the clean replicas using said channel parameter estimates.

The demodulated replicas are then decoded by the FEC decoder 911 and passed to the demultiplexer 912, which separates the signaling data from the effective payload data, which is extracted from the demodulator. The demodulator block 909 and the FEC decoder 911 together constitute a device for extracting information contained in the identified replicas.

The effective payload data is also directed to an FEC encoder 913 that also receives at its input signaling information from the clean replica that has just been demodulated. The output of the encoder 913 is a bit sequence that in theory is identical to that constituting the payload data of the twin replica of said clean replica.

The signaling information extracted by the demultiplexer 912 is used by a phase estimator device 907 to locate said twin replica in the memory 905 and to extract phase information therefrom (see equation [11] above). Said phase information, the amplitude and frequency shift estimates obtained by the block 909, the preamble sequence identified by the block 910, the signaling information obtained by the demultiplexer 912 and the bit sequence at the output of the encoder 913 constitute input to a baseband twin replica regenerator device 914. The regenerated replica and the adapted signaling information are passed to the interference cancellation processor 906, which operates on the content of the memory 905 to cancel any interference induced by the twin replica of the burst that has just been demodulated and decoded. The modulator is controlled by a controller 900.

As in FIG. 8, the blocks 906, 907, 912, 913, and 914 constitute additions compared to a prior art (D)SA demodulator, whereas the block 910 is merely modified. As in the FIG. 8 modulator, the controller 900, or rather the software that controls its operation, is also modified.

Comparing FIGS. 8 and 9 shows that implementing the invention requires only relatively marginal modification of the modulators, which need to be produced in large numbers and at moderate price since they are intended for residential users. The modifications required for the demodulators are relatively greater, but these are professional equipments that are produced in much smaller numbers.

The method of the invention has been investigated by an analytical theoretical study and by numerical simulationss that have highlighted its advantages over the prior art. The main results of that study are explained below.

Analytical modeling is used to compute an upper limit for the throughput T that can be achieved by a CRDSA method, independently of the details of its implementation. The standardized throughput T, defined as the average number of packets decoded correctly per time slot, is given by the product of the loading of the transmission channel (average number of packets transmitted per time slot) and the probability $P_{pd}(N_{iter}|G)$ that a packet received is decoded correctly. That probability depends on G, via the packet collision probability, and the number $N_{iter}$ of iterations of the interference cancellation algorithm:

$$T(N_{iter}|G) = G P_{pd}(N_{iter}|G) \qquad [17]$$

If $P_{ps}^A$ and $P_{pd}^B$ denote the probability of decoding correctly the first and second replicas, respectively, of a packet and noting that, because of considerations of symmetry, $P_{pd}^A = P_{pd}^B$, $P_{pd}$ may be expressed as follows:

$$P_{pd}(N_{iter}|G) = 1 - [(1 - P_{pd}^A(N_{iter}|G)) \cdot (1 P_{pd}^B(N_{iter}|G))] = 1 - [(1 - P_{pd}^A(N_{iter}|G))^2] \qquad [18]$$

An upper limit for $P_{pd}^A$ may be found with the aid of the following recursive equation:

$$P_{pd}^A(N_{iter}|G) \le P_{al}^A(G) + \sum_{i=0}^{G \cdot M_{slots}^{RA}-1} P_{int}(i|G)[P_{pd}^A(N_{iter}-1|G)] \qquad [19]$$

with the initial condition $P_{pd}^A(0|G)=0$.

In equation [19], $P_{al}^A(G)$ is the probability that a replica is the only one in its time slot, i.e. that it does not suffer any collisions. $P_{int}(i|G)$ is the probability that a replica is subject to i collisions (i+1 replicas transmitted in the same time slot) and $G \cdot M_{slots}^{RA}$ represents the maximum number of replicas that may be transmitted in the same time slot, $M_{slots}^{RA}$ being the number of time slots comprised in a RA frame.

It can be shown that:

$$P_{int}(i|G) = \binom{G \cdot M_{slots}^{RA}-1}{i} \left(\frac{2}{M_{slots}^{RA}}\right)^i \left[1 - \left(\frac{2}{M_{slots}^{RA}}\right)\right]^{G \cdot M_{slots}^{RA}-1-i} \qquad [20]$$

where $$\left(\frac{2}{M_{slots}^{RA}}\right)$$

is the probability that one of the two replicas of a particular packet is in a given time slot. It is deduced from this that $P_{al}^A(G) = P_{int}(0|G)$.

Equation [19] gives an upper limit for $p_{pd}^A$ because it does not take into consideration the effect of noise or situations, such as those illustrated by FIGS. 4A and 4B, in which interference cannot be cancelled successfully or the situation of "preamble collisions", which occur when two replicas having the same preamble collide with a time shift of less than the duration of one symbol, which prevents the recovery of the phase $\hat{\phi}[i_k, n_k^r]$ using equation [11]. Although it is difficult to evaluate a priori the probability of producing "insoluble" collisions, such as those represented in FIGS. 4A and 4B, the "preamble collision" probability can be calculated as a function of G, of $S_{PR}$ (the number of sequences that can be used as preambles), and of the maximum time shift $D_{max}$ between two packets belonging to the same time slot:

$$P_{pre-coll}(G) = \sum_{i=1}^{G \cdot M_{slots}^{RA}-1} P_{int}(i|G) \cdot \left[\sum_{j=1}^{i} \binom{i}{j} p^j (1-p)^{i-j}\right] \qquad [21]$$

where $p = 1/(S_{PR} \cdot D_{max})$. As is demonstrated below, under realistic normal operating conditions, $P_{pre-coll}$ is less than 1%.

There follows a consideration of numerical simulationss carried out using the Matlab software (http://www.mathworks.com/) and the OPNET software (OPNET Technologies, Inc. 7255 Woodmont Avenue, Bethesda, Md. 20814, United States). The model takes account of a plurality of TDMA CRDSA modulators affected by independent amplitude fluctuations. The signals generated by the various modulators are added after suffering a delay corresponding to a propagation time of the order of 250 milliseconds (ms) (typical for a geosynchronous satellite) and are affected by additive Gaussian white noise. The composite signal is then processed by a CRDSA method with a varying number of iterations, assuming perfect estimation of the parameters of the channel (amplitude, phase, packet delay). The traffic is modeled by a Poisson process.

Figure 10A:
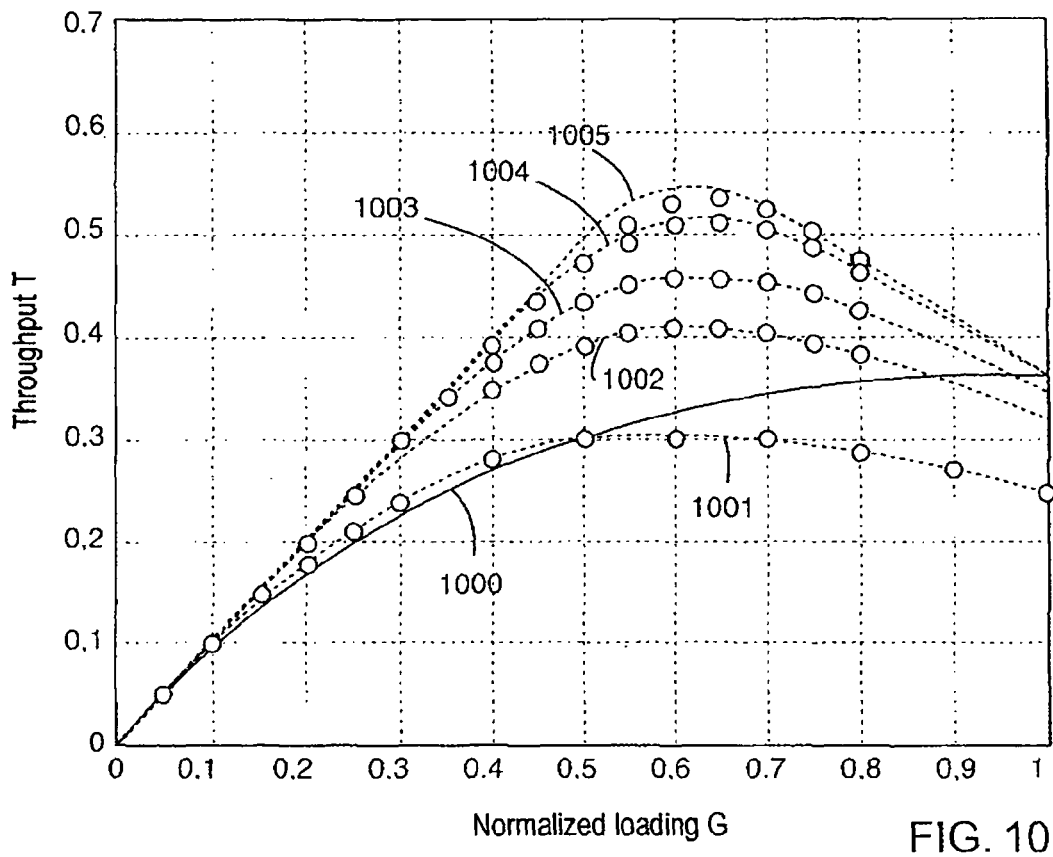

FIG. 10A shows the dependence of the normalized throughput T on the loading G of the channel for a CRDSA method with $N_{iter} = 1, 2, 3, 6$ and 16 (curves 1001, 1002, 1003, 1004 and 1005 respectively); the case $N_{iter} = 1$ in fact corresponds to the DSA method known in the art with k=2. The dashed line curves 1001-1005 represent the analytical results and the circles represent the simulation results. The solid line curve 1000 shows, by way of comparison, the performance of the conventional SA method. Note first that the analytical approach gives good results, that differ appreciably from the numerical simulationss only for $N_{iter} = 16$. The figure shows that the maximum value of T obtained by a CRDSA method is approximately 0.52 and is obtained for G≈0.65. Comparing this result to the normalized throughput of 0.5 (G≈0.38) that can be achieved by the SA method might suggest that the invention provides only a relatively marginal improvement. In reality, if the transmission delays are to be kept within acceptable limits, it is necessary to have the RA methods function under conditions guaranteeing a low probability of losing each packet, for example a probability of the order of 2%.

Figure 10B:
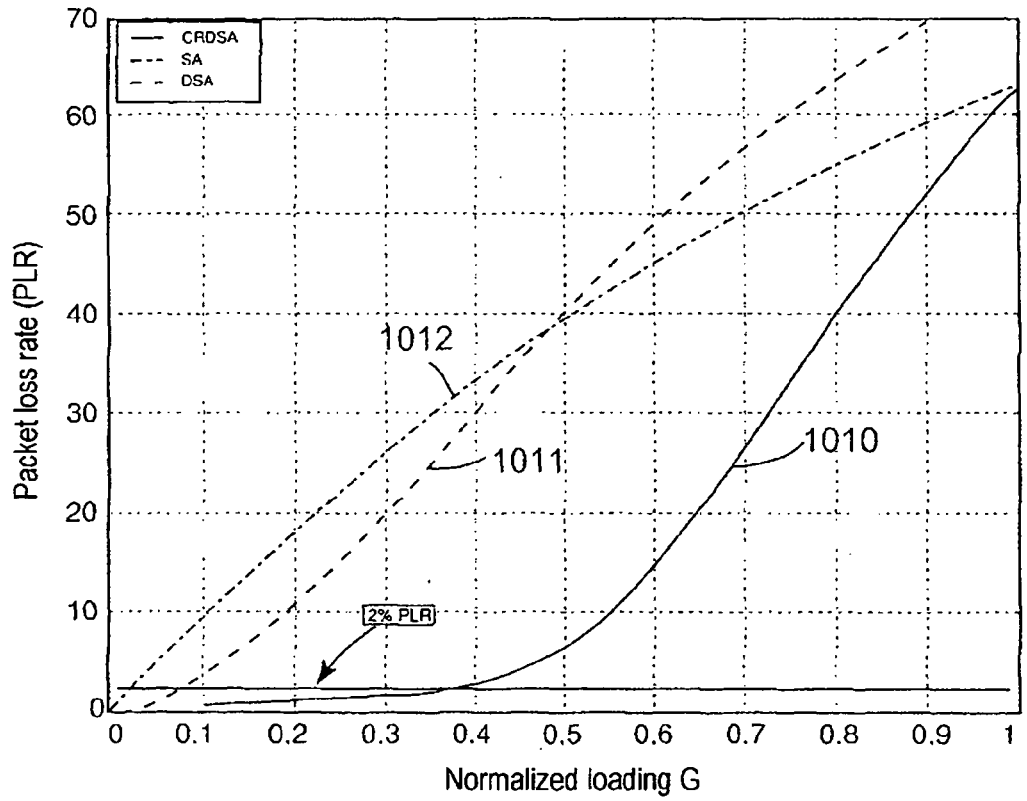

FIG. 10B shows the packet loss rate $$PLR(G) = 1 - \frac{T(G)}{G}$$

as a function of G for a CRDSA method with perfect channel estimation and $N_{iter}=10$, (solid line 1010), for a DSA method with k=2 (dashed line 1011), and for a SA method (chain-dotted line 1012). The figure shows that a packet loss rate PLR of 2% is obtained for a loading of the channel G of:

0.02 for the SA method;
 0.075 for the DSA method; and
 0.35 for the CRDSA method.

Compared to PLR=2%, the method of the invention increases the throughput by a factor of approximately 17 over the SA method and by a factor of 4.6 over the DSA method. The advantage of the invention resides not only in an increase in the normalized throughput for a given loading G, but also in the possibility of using a much greater channel loading without this causing unacceptable degrading of the PLR.

Clearly it is advantageous to use a flow control method, for example the method described above with reference to FIG. 6, to maintain the loading of the channel below a limit value, for example $G_{th}=0.4$.

FIG. 10C shows the dependency of the preamble collision probability $P_{pre-coll}$ on the loading G for preambles selected in a family of $S_{PR}=31$ (line 1020) or $S_{PR}=63$ elements (line 1021). The circles show the analytical results obtained from equation [21]. For a loading G=0.35, the value of this probability is approximately 0.0045 in the first case and 0.0022 in the second case. It may be concluded from this that the families of sequences of 30-60 bits are suitable under realistic conditions of use of the CRDSA method. It must be pointed out that to obtain acceptable synchronization in real systems it is necessary to use preambles of at least 48 symbols; as the number of bits of the bit sequence family is generally equal to the number of symbols of each sequence, the case $S_{PR}=31$ is particularly pessimistic.

Comparing FIGS. 10D and 10E highlights the efficacy of the interference cancellation method. The two figures show, in the form of a cloud of points, the real part and the imaginary part of the baseband signal corresponding to time slots in which collisions occur, respectively for $N_{iter}=1$ (FIG. 10D) and $N_{iter}=10$ (FIG. 10E). Note that, in the first case, the points are distributed quasi-uniformly because of multiple interference between packets sent by different satellite terminals whereas, after 10 iterations of the interference cancellation algorithm, they are very clearly grouped into four sets corresponding to the four points of the QPSK constellation. These figures were obtained taking a channel loading G=0.4 and eliminating additive Gaussian noise.

Above it is assumed that the channel is estimated perfectly and that there is no noise. Those assumptions are not made below.

Figure 10F:
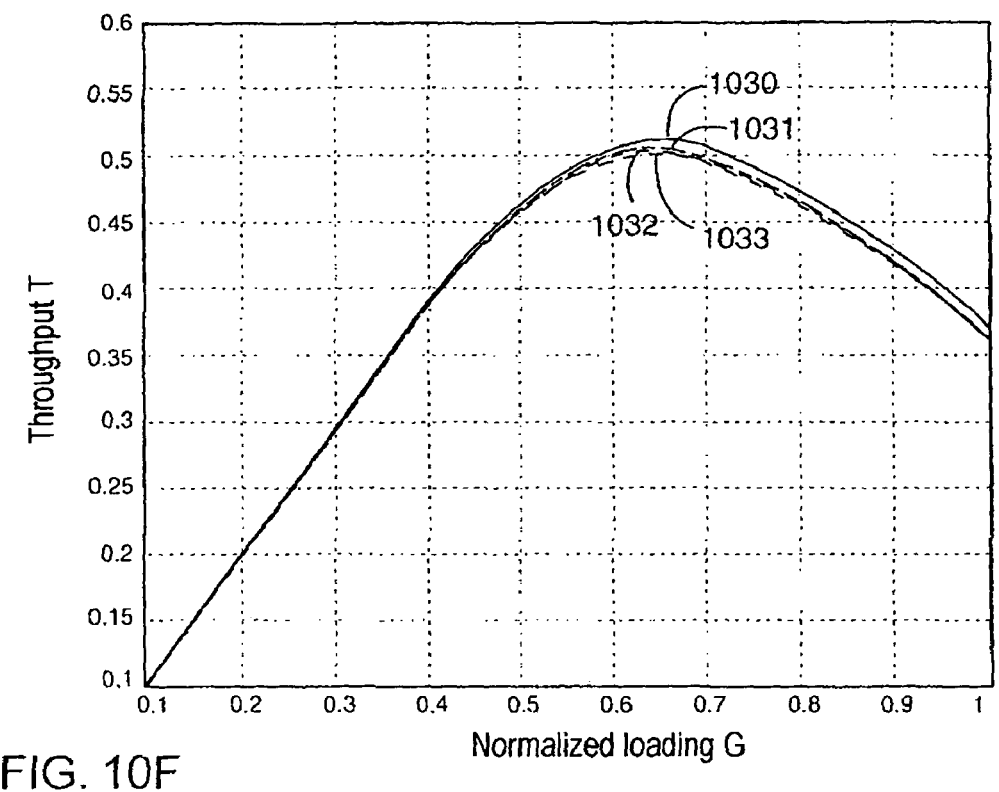

FIG. 10F shows the effect of additive Gaussian noise on the throughput that may be obtained using a method of the invention with $N_{iter}=10$. There are considered bursts comprising $N_{guard}=5$ guard symbols, a preamble of $N_{pre-a}=31$ symbols selected from a family of $S_{PR}=31$ sequences, and $N_{pay}=424$ payload data symbols (which corresponds to an ATM cell with a convolutional coding rate of 1/2 and QPSK modulation).

The FEC code achieves a bit error rate (BER) of $10^{-5}$ for a signal-to-noise ratio $E_s/N_0=4.2$ dB. Curves 1030, 1031, 1032 and 1033 correspond to an infinite signal-to-noise ratio and to signal-to-noise ratios of 8, 6 and 5 dB, respectively. Note that for a loading G=0.35, which corresponds to a PLR of 2%, which is deemed acceptable, there is practically no perceptible difference between these three situations. Simulations have been carried out to evaluate the impact of phase noise on the interference cancellation process. For a phase noise mask as specified in the above-mentioned document "ETSI TR 101 790 v1.2.1 (2003-01)—Digital Video Broadcasting (DVB); Interaction Channel for Satellite Distribution Systems; Guidelines for the use of EN 301 790", the results show that the impact of phase noise is negligible for a throughput from 128 Kbauds up.

Figure 10G:
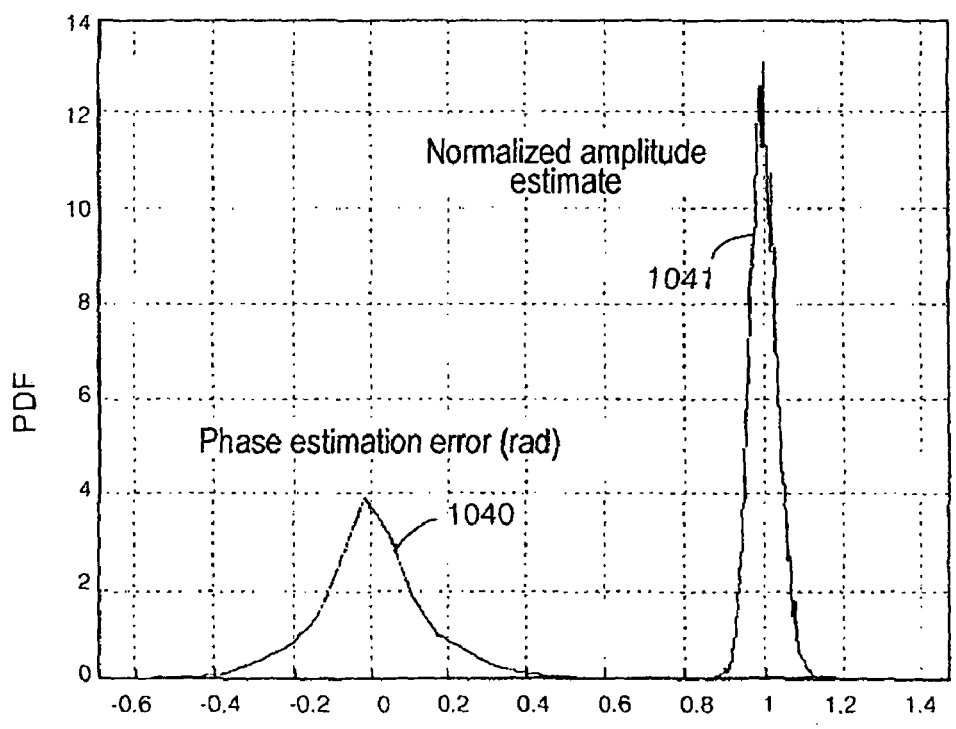
Figure 10H:
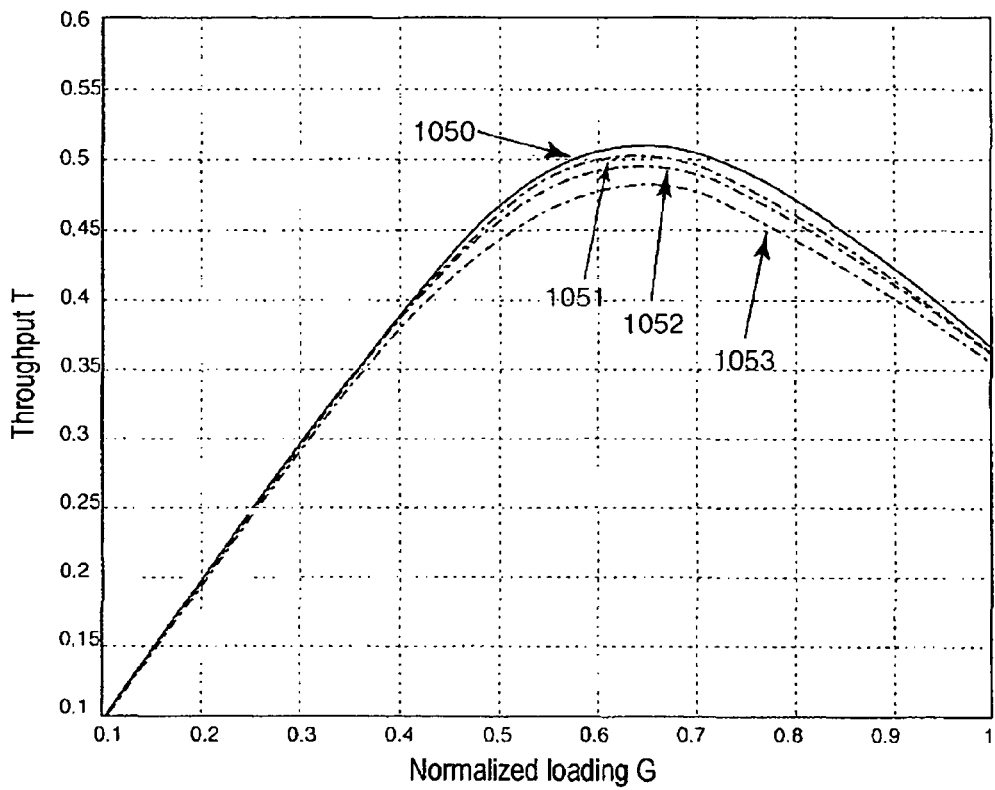

For a better understanding of the causes of degraded performance of the invention as the noise level increases, perceptible essentially for $G \geq 0.45$, it is beneficial to analyze the magnitude of the amplitude and phase estimation errors, which have a direct influence on the efficacy of the interference cancellation algorithm. FIG. 10G shows the probability density function (PDF) for the phase estimation error (curve 1040) and for the amplitude estimate (curve 1041) in the case of a signal-to-noise ratio $E_s/N_0=6$ dB and a loading G=0.4; only the time slots in which at least one collision occurs have been taken into account. The abscissa axis represents an angle (in radians) for the phase and a relative value for the amplitude (the ratio between the estimated amplitude and its real value). Note that the dispersion of the phase estimate is relatively high: this is not surprising, as the phase is calculated from the preamble, i.e. using only $N_{pre-a}=31$ symbols, whereas the amplitude estimation uses $N_{pay}=424$ payload data symbols. Furthermore, the amplitude is estimated from a "clean" replica, whereas the phase estimate uses a "dirty" replica, affected by collisions; an alternative implementation of the method of the invention which improves phase estimation is described below. A simplified analysis shows that the equivalent signal-to-noise ratio (SNR) due to the presence of a phase error $\Delta \hat{\phi}$ may be approximated by SNR=$1/\delta_A^2$ where $\delta_A$ represents the standard deviation of the phase noise. Above, it is implicitly assumed that the signals sent by the various satellite terminals arrive at the gateway with the same intensity (L[i,n]=constant, see equation [9]). FIG. 10H shows the influence of intensity differences between the received signals; in the simulations used to produce this figure noise was ignored, the number of iterations considered was $N_{iter}=10$, and the amplitude of the signals sent by the various terminals was modeled as a random variable following a logarithmico-normal distribution with a mean value of 0 dB and a standard deviation $\sigma_{Rx}=0, 1, 2, 3$ dB for the curves 1050, 1051, 1052 and 1053, respectively. Note that performance is moderately degraded in the maximum throughput region (G 0.65) but the deterioration is negligible for G=0.35.

Figure 10I:
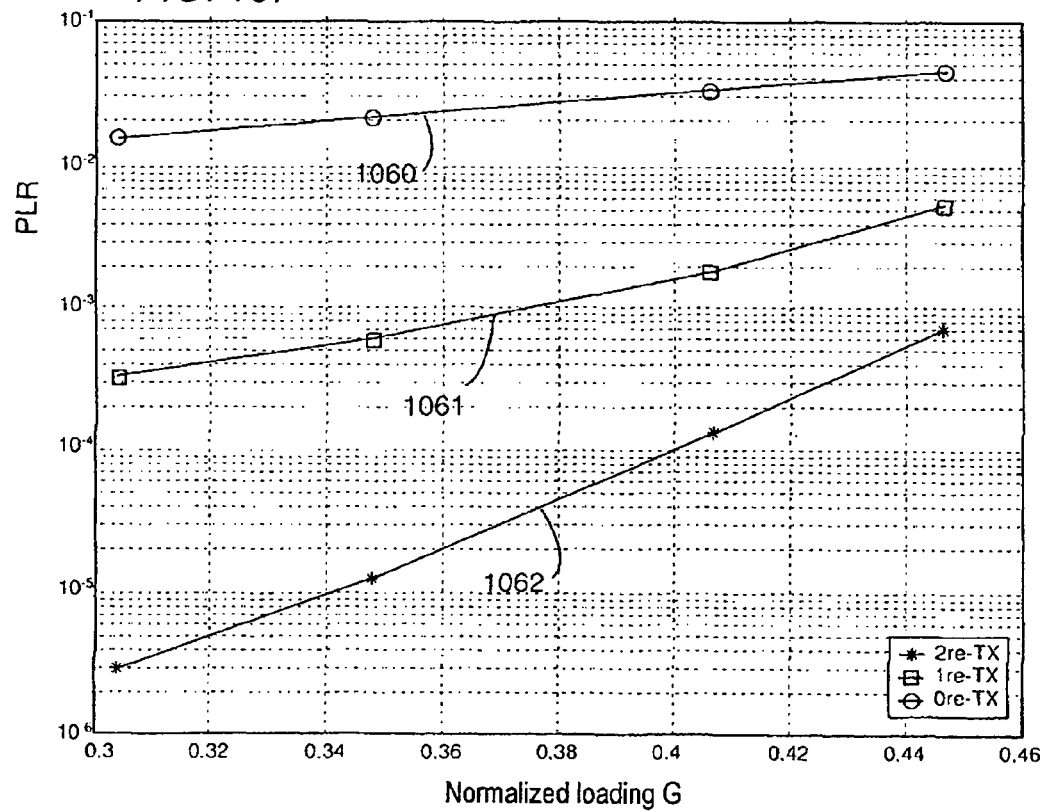

A packet loss rate (PLR) of 2%, which can be achieved for G=0.35, is unacceptable in many applications. For this reason, like the prior art methods, the invention provides the possibility of retransmitting packets that have not been received correctly. For example, and as discussed above, it is possible for packets lost during their first transmission to be retransmitted once only, but it is preferable to retransmit them twice in the same frame with an arbitrary time shift. In any event, for PLR (retransmission step)=2%, the increase in G induced by retransmissions is low. In FIG. 10I, curves 1060, 1061, and 1062 show the packet loss rate PLR for 0, 1, and 2 retransmissions, respectively. Note that, taking G=0.35 and 2 retransmissions, the packet loss rate is of the order of only $10^{-5}$.

FIG. 10J shows the probability density function PDF for the transmission delay of a packet, in the case G=0.4 and with simultaneous retransmission of packets that are not coded correctly on their first transmission. The left-most peak, the area of which is approximately 0.98, corresponds to packets decoded correctly after only one transmission; their average delay is 335 ms. In the absence of retransmission, that delay will be slightly lower, of the order of 308 ms, since the effective loading of the channel would be lower (no retransmitted packets). The secondary peak corresponds to the 2% of packets that are retransmitted and received with an average delay of approximately 1.15 s. The figure refers to the situation in which each packet that needs to be retransmitted is retransmitted twice in the same frame. If there were only one retransmission, the average delay would be shortened by only about 2 ms, due to a modest reduction in the loading of the channel, but the PLR would be multiplied by 10 (see FIG. 10I). The benefit of the solution adopted is therefore clear.

The description above considers only the provisions of a "pure" CRDSA method, but in certain situations it is advantageous to use an hybrid CRDSA-DA method. Such a situation arises if the traffic consists of the superposition of a Poisson process and a bulky traffic component, for example. In FIG. 10K, the dashed line 1070 represents "Poisson" traffic, in which the number of packets received increases regularly over time, and the solid line 1071 represents bulky traffic, in which the packets arrive in sparse large batches. The "Poisson" traffic is typically produced by residential users, who are numerous and transmit small bursts of data independently of each other. To study the performance of a CRDSA-DA method of the invention, hybrid traffic consisting of 90% Poisson sources and 10% bulky traffic sources was simulated; the total loading of the channel was 40%. In a first case, representing the prior art, the data was transmitted using only a DA method; RA frames were assigned only to enable the transmission of capacity requests. As can be seen in FIG. 10L, which represents the probability density function of the transmission delay, almost all of the packets are transmitted with a delay from 1 to 1.5 s, with an average delay of the order of 1.1 s.

FIG. 10M shows the probability density function of the transmission delay if the frames are assigned to RA (CRDSA) transmission or to DA transmission as a function of the characteristics of the traffic. In this instance, CRDSA transmission accounts for a channel loading of 0.25 and DA transmission a loading of 0.15. Note that the distribution is bimodal: the traffic corresponding to bulky traffic continues to be transmitted by a DA method, and the average delay remains of the order of 1.1 s; however, residential users can transmit their data immediately, without waiting to be assigned a DA frame. Consequently, for these users, the delay can be as short as 0.35 s.

The invention is described above in detail with reference to one particular implementation, but numerous variants are feasible.

For example, in the implementation described above, the replicas of the same packet are transmitted on the same carrier at the same frequency; in other words, the CRDSA method is based on an SA protocol with time diversity. If the senders (the satellite terminals) are able to transmit on a plurality of frequency channels, it is equally possible to use a CRDSA method based on a SA protocol with frequency diversity. In such a method, the replicas of the same packet are transmitted with a pseudo-random frequency shift, which is additional to the time shift considered above or which replaces it (in which case, the frequency-sifted replicas are transmitted simultaneously). In this case, the signaling information transmitted with each replica must enable the twin replica(s) to be located in the frequency domain and not (or not only) in the time domain.

The modifications required to the transmitter and receiver equipments to implement this implementation of the invention will be evident to the person skilled in the art.

Another particularly beneficial variant of the CRDSA method reduces the overhead introduced by the signaling information and thereby makes use of the channel more efficient. In this implementation, the time or frequency shift between two replicas of the same packet is determined with the aid of a pseudo-random function of the parameters that are known both by the sender of the packet (satellite terminal) and by the receiver (gateway) or which in any event form part of the information contained in the payload data. In this way, the only "signaling information" that must be transmitted specifically is a bit indicating the sign of the shift (positive for the first replica and negative for the second). Since communications protocols generally provide unused bits, one of those bits may be used for this purpose: this implementation of the CRDSA method does not generate any overhead.

For example, the payload data of the packet #k generally contains, among other things, the $MAC_k$ address of the satellite terminal that transmitted said packet and a packet counter $N_{packet\_k}$. It is therefore possible to determine the time shift of the replicas with the aid of a pseudo-random function $F(MAC_k, N_{packet\_k})$ with integer values uniformly distributed between 1 and $M_{slot}-1$. To be more precise, if $n_k$ indicates the time location of a replica, the location of its twin replica is given by the equation:

$$n_k^r = [n_k s_k F(N_{packet\_k}, MAC_k)] \mod M_{slot} \quad [22]$$

In equation [22], $s_k$ has the value +1 for the first replica and −1 for the second replica and is the only information that must be added specifically to the payload data for the requirements of the CRDSA method. The "modulo" operator is necessary to ensure that the twin replica is located in the time slot concerned.

Note that a pseudo-random function depending only on the MAC address will be less satisfactory, since if a plurality of consecutive packets were sent by the same satellite terminal, the distance between replicas would be the same for all those packets, and this would be liable to generate numerous "inextricable" access conflicts, of the type shown in FIGS. 4A and 4B.

Alternatively, other fields of the payload data, or even all of the payload data, could be used to determine the absolute value of the time shift.

The same principle may be applied to CRDSA with frequency diversity.

Although the above description refers throughout to a "preamble" situated, as the name indicates, at the beginning of each data packet, this is not essential. The preamble may be replaced by an acquisition bit sequence having the same auto-correlation and cross-correlation properties, but situated at the end of the packet, or even in the middle of the packet. The invention is in no way limited to the use of a "preamble" in the strict sense of that term.

Implementations of the invention that differ from the implementation described above in a different approach to the problem of estimating the phase of the "dirty" replicas to be generated and to be cancelled, and that prove to be particularly advantageous for certain applications at least, deserve to be considered in more detail.

The first of these alternative implementations improves the estimate of the phase of the carrier of the replicas to be cancelled by replacing a "global" estimate that is independent of time and therefore identical for all the symbols of said replica, which is obtained only from the preamble, with a different estimate for each symbol. This time-dependent estimate may be obtained with the aid of a data-aided phase-locked loop (DA-PLL), exploiting the known payload data transported by said "dirty" replica, which knowledge was acquired on decoding the corresponding "clean" replica. The improvement of the phase estimation, and therefore of interference canceling, that can may be achieved in this way is particularly significant if the transmission channel is affected by high phase noise and/or the transmission throughput is low.

Before describing this first alternative implementation of the invention, it is necessary to consider in more detail the effect of phase estimation errors on the efficacy of the step of canceling interference caused by collisions between replicas of different packets. To this end, the first step is to re-write, in a slightly different form, the expression for the discrete signal obtained by sampling the received signal that has been demodulated coherently (equation [5]):

$$\vec{r}[n] = \sum_{i=1}^{N_{ST}} \delta[i,n] L[i,n] \vec{s}[i,n,q] z^{-D[i,n]} \exp\{j(\bar{\phi}[i,n])\} + \vec{w}[n] \quad [23]$$

Equation [23] differs from equation [5] in that the phase parameter $\bar{\phi}$ has been redefined also to include the contribution caused by the frequency shift $\Delta\omega$ of the local oscillator. The phase parameter $\bar{\phi}$ redefined in this way is made up of two contributions:

$$\bar{\phi}[i,n] = \bar{\psi}[i,n] + \bar{\theta}[i,n]$$

$$\bar{\theta}[i,n] = [\bar{\theta}_0[i,n], \bar{\theta}_0[i,n] + \Delta\omega[i,n]T_s, \ldots, \bar{\theta}_0[i,n] + \Delta\omega[i,n](N_{slot}^{RA}-1)T_s] \quad [24]$$

where $\bar{\psi}$, $\bar{\theta}_0$ and $\bar{\theta}[i,n]$ respectively represent the contribution of phase noise, the initial phase of the carrier in the time slot n for the satellite terminal i, and the residual phase error caused by the frequency error $\Delta\omega$.

Using the modified notation, and in accordance with the implementation of the invention described above, the cancellation of a replica coming from the satellite terminal i and causing a collision in the time slot $n^r$ on iteration $N_{iter}$ of the interference cancellation algorithm can be written as follows:

$$\vec{r}[n^r, N_{iter}+1] \approx \vec{r}[n^r, N_{iter}] - \hat{A}[i,n]\exp[j\hat{\phi}[i,n^r]][\vec{s}_{pre}[i], \vec{s}_{pay}[i,n]] \quad [25]$$

in which, for simplicity, the index k has been omitted, together with the identifier q of the corresponding "clean" replica.

For simplicity, it is considered that on iteration $N_{iter}$ the time slot $n^r$ contained only one "useful" packet $r^u[n^r]$, which is to be recovered, and also the interfering replica coming from the satellite terminal i. We may therefore write:

$$\vec{r}[n^r, N_{iter}] \approx r^u[n^r] + \hat{A}[i,n^r] P[i,n^r][\vec{s}_{pre}[i], \vec{s}_{pay}[i,n], \vec{s}_{guard}] \quad [26]$$

where P is the matrix whose elements represent the phase of each symbol of the interfering replica:

$$P[i,n] = \begin{pmatrix} \exp[j\phi_1[i,n]] & 0 & \cdots & 0 & 0 \\ 0 & \exp[j\phi_2[i,n]] & \cdots & 0 & 0 \\ \vdots & \vdots & & \vdots & \vdots \\ 0 & 0 & \cdots & \exp[j\phi_{N_{slot}^{RA}-1}[i,n]] & 0 \\ 0 & 0 & \cdots & & \exp[j\phi_{N_{slot}^{RA}}[i,n]] \end{pmatrix} \quad (27)$$

and $\phi_k[i,n] \in \bar{\phi}[i,n]$, $k=1 \ldots N_{slot}^{RA}$.

If the amplitude estimate $\hat{A}[i,n] \approx A[i,n^r]$ is considered to be practically perfect and the bit sequence of the "clean" replica $[\tilde{\vec{s}}_{pre}[i], \tilde{\vec{s}}_{pay}[i,n]] \approx [\vec{s}_{pre}[i], \vec{s}_{pay}[i,n]]$ is recovered without errors, then equation [25] becomes:

$$\vec{r}[n^r, N_{iter}+1] \approx r^u[n^r] + \hat{A}[i,n^r]\{P[i,n^r] - \exp[j\hat{\phi}_{pre}[i,n^r]]I\}[\vec{s}_{pre}[i], \vec{s}_{pay}[i,n]] = r^u[n^r] +$$
$$\hat{A}[i,n^r]\exp[j\hat{\phi}_{pre}[i,n^r]]\Delta P[i,n^r][\vec{s}_{pre}[i], \vec{s}_{pay}[i,n]] = r^u[n^r] + i^u[n^r] \quad [28]$$

in which:

$$\Delta P[i,n^r] = \begin{pmatrix} \exp[j(\phi_1[i,n] - \hat{\phi}_{pre}[i,n^r])] - 1 & \cdots & 0 \\ 0 & \cdots & 0 \\ \vdots & & \vdots \\ 0 & \cdots & 0 \\ 0 & \cdots & \exp[j(\phi_{N_{slot}^{RA}}[i,n] - \hat{\phi}_{pre}[i,n^r])] - 1 \end{pmatrix} \quad [29]$$

The phase estimate is denoted $\hat{\phi}_{pre}$ rather than $\hat{\phi}$ to highlight the fact that this estimate has been determined only from the preamble of the replica to be cancelled.

If $(\phi_k[i,n] - \hat{\phi}_{pre}[i,n]) \ll 1$ $\forall k$ it is possible to replace $\Delta P$ by the matrix $\Delta S$ defined as follows:

$$\Delta S[i, n^r] = \begin{pmatrix} \sin(\phi_1[i,n] - \hat{\phi}_{pre}[i,n]) & \cdots & 0 \\ 0 & \cdots & 0 \\ \vdots & \vdots & \vdots \\ 0 & \cdots & 0 \\ 0 & \cdots & \sin(\phi_{N_{slot}^{RA}}[i,n] - \hat{\phi}_{pre}[i,n]) \end{pmatrix} \approx \quad [30]$$

$$\begin{pmatrix} (\phi_1[i,n] - \hat{\phi}_{pre}[i,n]) & \cdots & 0 \\ 0 & \cdots & 0 \\ \vdots & \vdots & \vdots \\ 0 & \cdots & 0 \\ 0 & \cdots & (\phi_{N_{slot}^{RA}}[i,n] - \hat{\phi}_{pre}[i,n]) \end{pmatrix}$$

Assuming that the residual interference $i^u[n^r]$ can be approximated by a Gaussian random variable, it is possible to define the signal-to-interference ratio SIR as follows:

$$SIR = \frac{E_{pay}\{|\bar{r}^u[n^r]|^2\}}{E_{pay}\{|\bar{i}^u[n^r]|^2\}} \approx \frac{E_{pay}\{A[n^r]^2\}}{E_{pay}\{A[n^r]^2(\phi_k[i,n] - \hat{\phi}_{pre}[i,\hat{n}^r])^2\}} = \frac{1}{\sigma_{\Delta\phi}^2} \quad [31]$$

in which:

$E_{pay}\{\;\}$ represents the respective value of the field of the interfering replica that corresponds to the payload data, $\Delta\hat{\phi}_k = \phi_k[i,n] - \hat{\phi}_{pre}[i,n^r]$, $\sigma_{\Delta\phi}^2 = E_{pay}\{\Delta\hat{\phi}_k^2\}$.

For $\sigma_{\Delta\phi}=5°$, SIR=21 dB and $\sigma_{\Delta\phi}=15°$, SIR=11.6 dB. If the payload data of the packets is protected by an error corrector code, it may be estimated that a phase estimation error up to 15° (standard deviation) may be tolerated. As shown below, for communications systems comprising a low throughput channel, such as systems complying with the SATMODE standard, the first implementation of the invention leads to much higher phase estimation errors, explaining the necessity for an improvement.

In this second implementation of the invention, the phase estimate $\hat{\phi}_{pre}$ that is constant over the whole of the replica to be cancelled is replaced by a phase estimate $\hat{\phi} = [\hat{\phi}_1, \ldots \hat{\phi}_{N_{slot}^{RA}}]$ that takes a different value in relation to each sample representing payload data of said replica; $\hat{\phi}$ remains equal to $\hat{\phi}_{pre}$ in relation to the samples of the preamble. Equation [29] is therefore modified as follows:

$$\Delta P'[i, n^r] = \quad [32]$$

$$\begin{pmatrix} \exp[j(\phi_1[i,n] - \hat{\phi}_{pre}[i,n^r])] - 1 & \cdots & 0 \\ 0 & \cdots & 0 \\ \vdots & \vdots & \vdots \\ 0 & \cdots & 0 \\ 0 & \cdots & \exp[j(\phi_{N_{slot}^{RA}}[i,n] - \hat{\phi}_{pre}[i,n^r])] - 1 \end{pmatrix}$$

The problem therefore arises of determining the time-varying phase estimate $\hat{\phi}[\hat{\phi}_1, \ldots \hat{\phi}_{N_{slot}^{RA}}]$. In the second implementation of the invention, a suitable estimate is obtained with the aid of a data-aided phase-locked loop (DA-PLL), the data in question being represented by the bit sequence representing the payload of the replica to be cancelled, which is known from the corresponding "clean" replica. The equations of the phase-locked loop are as follows:

$$\hat{\phi}k[i, n^r] = \hat{\phi}_{k-1}[i, n^r] - \gamma e_\phi(k) \text{ for } k = N_{pre}^{RA} + 1, \ldots, N_{pre}^{RA} + N_{pay}^{RA} \quad [33]$$

$$e_\phi(k) = \Im\{r[n^r, N_{iter}](k) \cdot \hat{s}_{pay}^*[i,n](k) \cdot \exp(-j\hat{\phi}_{k-1}[i,n^r])\}$$

$$\gamma = \frac{4B_L T_s}{\eta}$$

in which $\eta$ is the slope of the curve in S of the loop ($\eta=1$ for signals of normalized power) and $B_L T_s$ is the normalized noise band of the loop, a standard design parameter of phase-locked loops, linking the gain of the loop to its response time. The loop is initialized with the phase estimate obtained from the preamble, in other words $\hat{\phi}_k[i,n^r]_{k=N_{pre}^{RA}} = \hat{\phi}_{pre}$.

Figure 11:
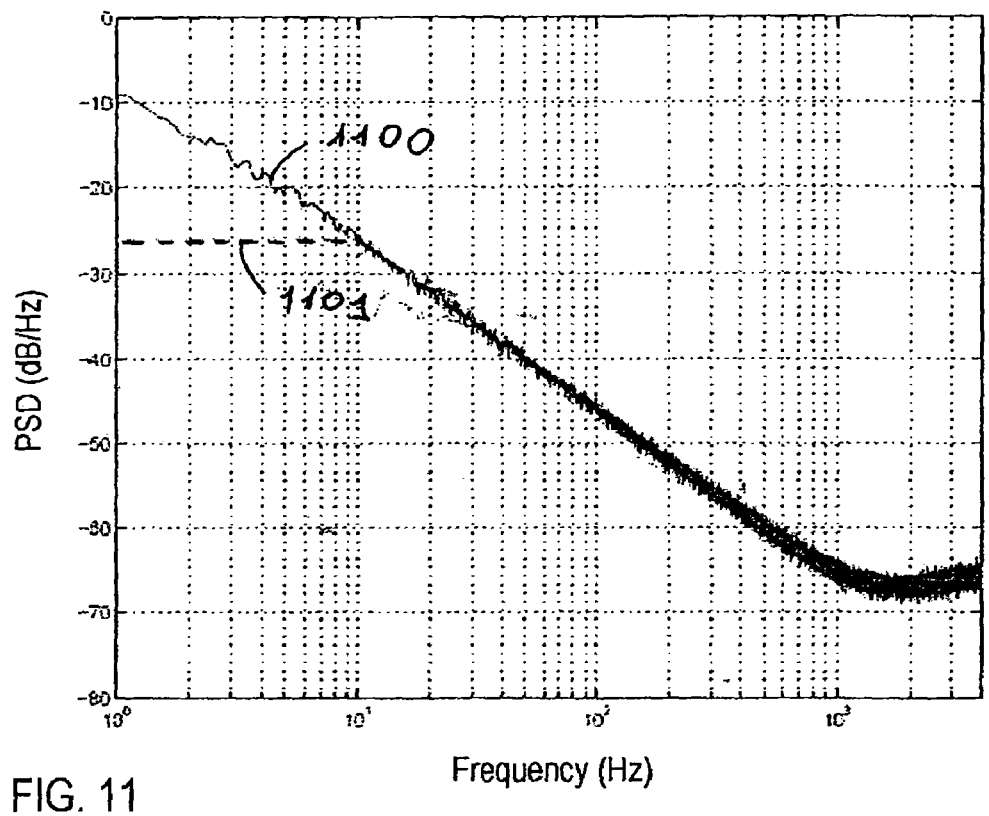
FIG. 11 shows the spectral density of the phase noise of the SATMODE standard.
Figure 12:
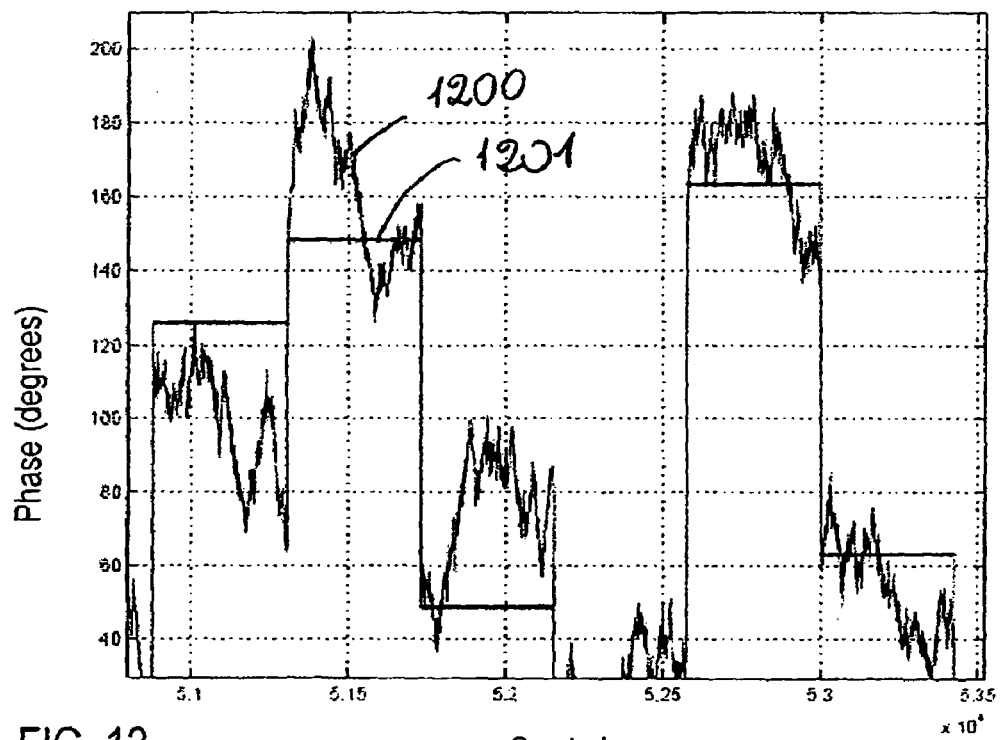
FIG. 12 shows the time dependency of the phase of the carrier of a signal affected by phase noise and the corresponding phase estimate.
Figure 13:
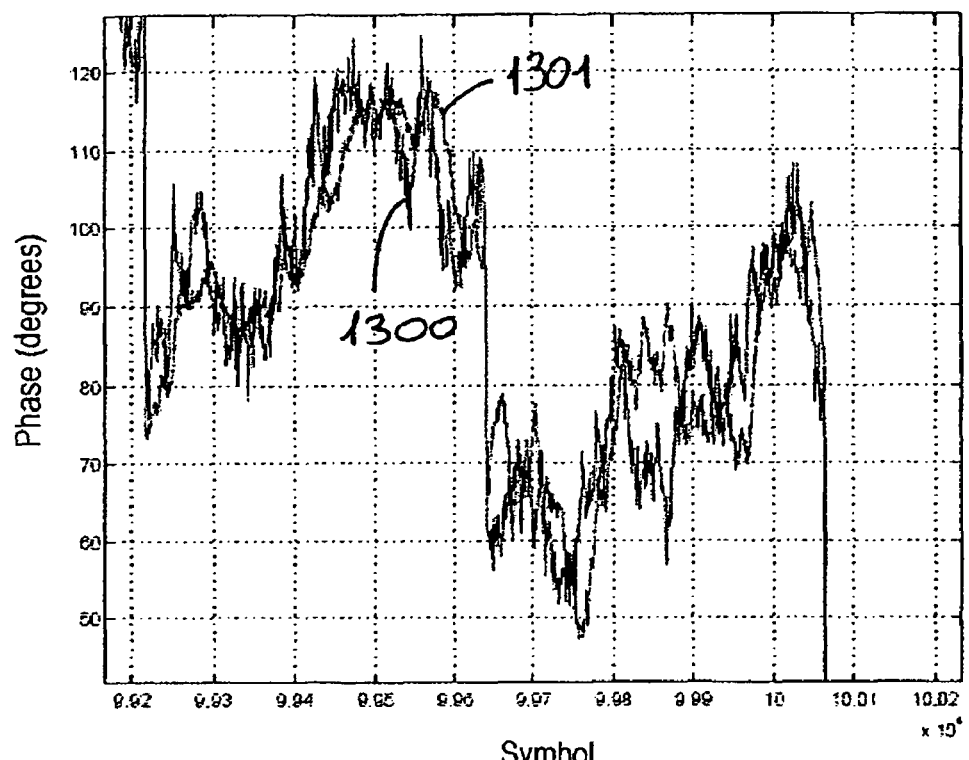
FIG. 13 shows the time dependency of the phase of the carrier of a signal affected by phase noise and the corresponding phase estimate obtained with a second implementation of the invention.

The effect on the SIR of using an estimate of phase varying in time is discussed below for a SATMODE system operating at a throughput of 8 kbaud in the presence of synthetic phase noise approximating the SATMODE phase noise mask (for more information, see the document "SATMODE Modem Layer Specification SMD-SP-SES-01000-1-2"). The power spectral density (PSD) of the phase noise (line 1100) and the reference mask (line 1101) are represented in FIG. 11. The numerical simulationss effected show that in the absence of phase noise, $\sigma_{\Delta\phi} = \sigma_{\Delta\theta} \approx 8°$, which corresponds to an SIR of 17.1 dB. When the phase noise is introduced, the use of a phase estimate based only on the preamble leads to $\sigma_{\Delta\phi} \approx 29.7°$, largely dominated by the contribution of said phase noise ($\sigma_{\Delta\psi} \approx 28.7°$); consequently, the SIR falls to 5.7 dB. The introduction of the phase-locked loop (equations [33]) necessitates determination of the optimum value of $B_L T_s$, which minimizes the variance of the phase estimation error; it is found that $B_L T_s = 0.01$, which leads to reducing the contribution of the phase noise $\sigma_{\Delta\psi}$ to a value of 9.75° and the total phase error to $\sigma_{\Delta\phi}$=10°, which corresponds to an SIR of approximately 15 dB. The insufficiency of the first implementation of the invention in the application considered here is made evident by FIG. 12, which compares the time dependency of the phase for a simulated signal characterized by a signal-to-noise ratio $E_s/N_o$=6 dB (line 1200) and the phase estimate based on the preamble (line 1201), which is constant in each time slot. The efficacy of the phase-locked loop may be assessed from a qualitative point of view by comparing the real dependency of the phase for the same simulated signal (line 1300 in FIG. 13) with the estimate $\hat{\phi}=[\hat{\phi}_1,\ldots\hat{\phi}_{N_{slot}^{RA}}]$ (line 1301). It is important to note that, in FIGS. 12 and 13, the data packets are shown as if they occupied consecutive time slots, whereas in reality they are separated by a random number of time slots.

Figure 14:
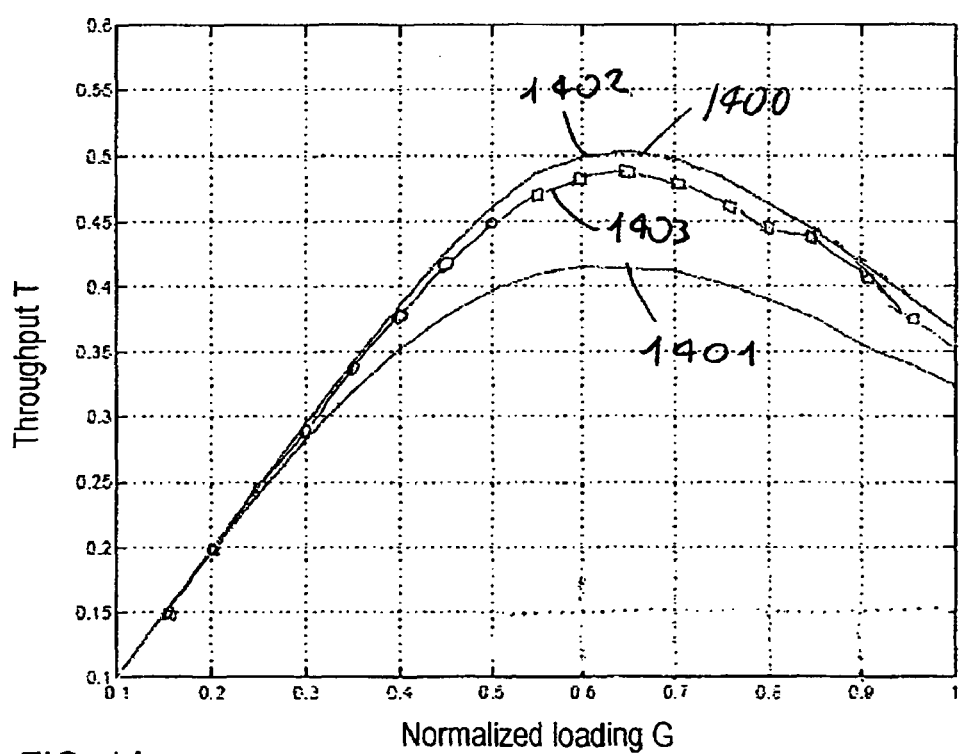
FIG. 14 is a graph showing the dependency of the throughput as a function of the normalized loading of the channel and indicating the performance improvement obtained by the second implementation.

FIG. 14 shows the throughput T as a function of the normalized load G for the SATMODE system (8 kbaud, $E_s/N_o$=6 dB, $N_{guard}^{RA}$=5, $N_{iter}$=10):

- with no phase noise (line 1400);
- with the FIG. 11 phase noise and a phase estimate based only on the preamble (line 1401);
- with the FIG. 11 phase noise and a phase estimate depending on the time obtained with the aid of the phase-locked loop from equation [29] (line 1402);
- with the FIG. 11 phase noise and a time-dependent phase estimate obtained with the aid of the phase-locked loop from equation [29], where the statistical distribution of the transmission power of the satellite terminals obeys a log-normal law with a standard deviation of 2 dB (line 1403).

It can be seen that the use of a phase-locked loop allows the system to operate without significant loss of throughput even in the presence of phase noise, which is not the case for phase estimation based only on the preamble. On the other hand, the preamble-only method is well suited to systems operating at higher throughputs, such as a 128 kbaud DVB-RCS system, for which both implementations of the invention are substantially equivalent.

The third implementation does not aim so much to improve the performance of the method of the invention as to simplify it, and to simplify the structure of the transmit and receive equipments for implementing it. The need for a family of preambles instead of the single preamble of the (D)SA protocol implies additional complexity, particularly at the receiver, where a parallel preamble search must be effected. Further, using a single preamble improves compatibility, on the upstream side, of the protocol of the invention with existing standards, such as SATMODE, DVB-RCS and IPOS.

In the third implementation, this additional complexity can be avoided by using the same preamble for all the packets transmitted, as in the prior art, and exploiting the known bit sequence expressing the payload data of a replica to be regenerated and cancelled as acquired from the corresponding "clean" replica to estimate the phase parameter.

If the same preamble is used for all of the packets, equation [11] can no longer be used to estimate the phase of a replica that has suffered a collision (the single preamble continues to be usable to identify and demodulate the "clean" replicas). However, the bit sequence expressing the payload data, which is known if the corresponding "clean" replica has been identified, can be considered to be approximately orthogonal to the sequences of the other packets: it can therefore be used to estimate phase in a similar way to the preambles of the first implementation.

Generally speaking, not all of the portion of the received signal that contains the payload data is used, but only a number $L_{coherent}$ of symbols, starting from the symbol $K_0$, with $1 \leq K_0 \leq N_{pay}^{RA} - L_{coherent}$. The phase estimate is therefore given by the equation:

$$\phi_{coherent}(n^r, N_{iter}) = \arg\left\{\sum_{k=K_0+N_{guard}^{RA}+N_{preamble}^{RA}}^{k=K_0+N_{guard}^{RA}+N_{preamble}^{RA}+L_{coherent}} r[n^r, N_{iter}](k) \cdot \hat{s}_{pay}^*[i, n^r](k)\right\} \quad [34]$$

in which $N_{guard}^{RA}$ and $N_{preamble}^{RA}$ represent the number of guard symbols and the number of symbols in the preamble, $r[n^r,N_{iter}](k)$ represents the $k^{th}$ sample of the time slot in which a collision occurs, $\hat{s}_{pay}[i,n^r](k)$ represents the $k^{th}$ symbol representing the payload data of the "clean" replica corresponding to the "dirty" replica to be cancelled, and * represents the complex conjugate operator.

As discussed above, equation [34] exploits the cross-correlation properties of the bit sequences representing the payload data of different packets, whereas equation [11] exploits the cross-correlation properties of the preambles.

It is equally possible to combine the second and third implementations of the invention by using equation [34] to initialize the phase-locked loop of equation [33]. This combines the advantages of both implementations: the immunity to phase noise characteristic of the second implementation, particularly with low throughput, and the simplicity of the third implementation. If the phase-locked loop is used, it is advantageous to choose $K_0$=1, i.e. to use for the initialization the first $L_{coherent}$ symbols of the payload data of the packet and to start the loop in the middle of the initialization window (i.e. from the symbol $L_{coherent}/2$ or $(L_{coherent}+1)/2$). However, if $\phi_{coherent}$ is used directly to regenerate the interfering replica to be cancelled, it is generally preferable to choose the central symbols of the packet, i.e. to take $K_0=(N_{pay}^{RA}+L_{coherent})/2$.

The results of four numerical simulationss of the third implementation of the invention are considered below.

Consideration is given firstly to transmission with no phase noise, where $N_{guard}^{RA}$=5, a throughput of 128 kbaud, a signal-to-noise ratio $E_s/N_o$=6 dB and a normalized loading G=0.4. The table below gives the standard deviation of the phase estimation error $\sigma_{\Delta\phi}=\sigma_{\Delta\theta}$ and the corresponding SIR as a function of the number $L_{coherent}$ of samples used for the phase estimation:

| $L_{coherent}$ | $\sigma_{\Delta\phi} = \sigma_{\Delta\theta}$ (degrees) | SIR (dB) |
| --- | --- | --- |
| 5 | 23.8° | 7.6 |
| 15 | 13.3° | 13.3 |
| 31 | 8.5° | 16.5 |
| 63 | 6.1° | 19.4 |

By comparison, if a preamble of $N_{pre}^{RA}$=31 symbols is used for the phase estimation, as in the first implementation, then $\sigma_{\Delta\phi}=\sigma_{\Delta\theta}$=8°. It is therefore found that, for an equal number of symbols used for the phase estimation, the third implementation offers performance entirely comparable to that of the first implementation, despite its greater simplicity of implementation. The phase estimation error may be reduced further by increasing $L_{coherent}$: the optimum value of this parameter is the result of a compromise between reduced phase error and increased complexity (increase in the number of terms in the integral in equation [34]).

Figure 15:
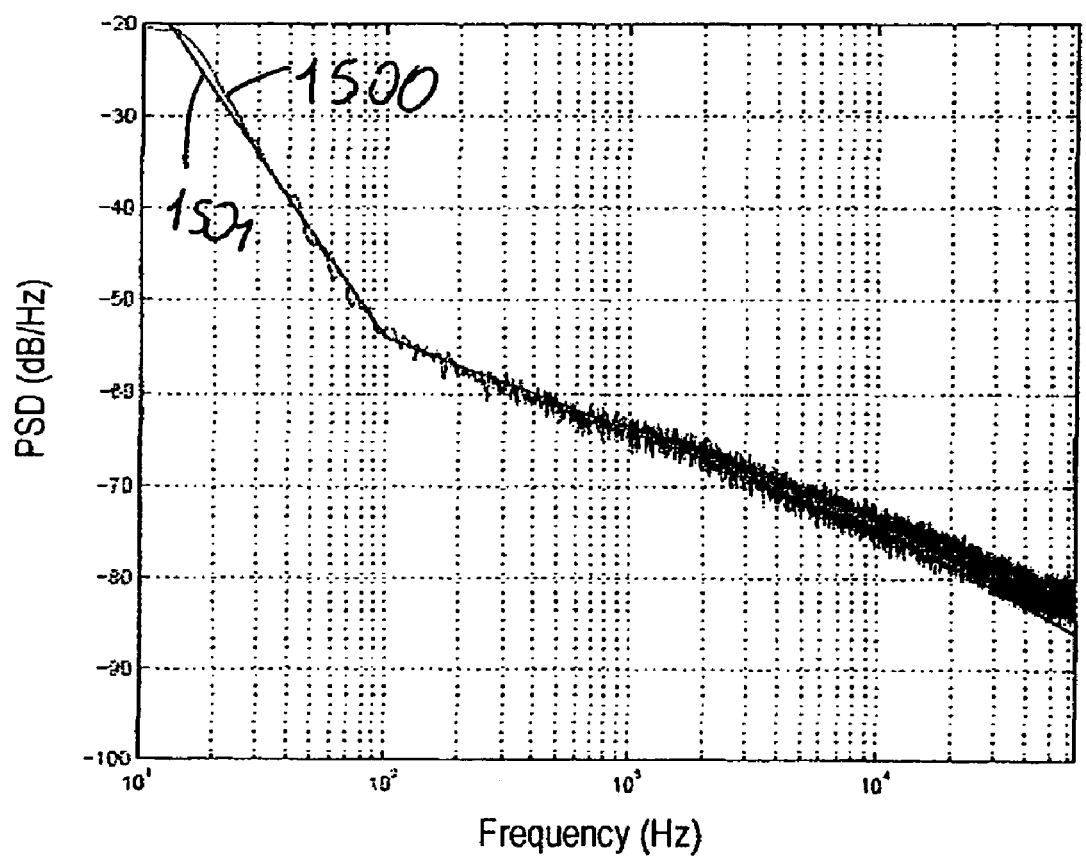
FIG. 15 shows the spectral density of the phase noise of the DVB-RCS standard.

Consideration is given below to the situation in which synthetic phase noise corresponding to the phase noise mask of the DVB-RCS standard is also present (see FIG. 15: the line 1500 represents the spectral power density of the synthetic noise used in the simulations, and the line 1501 represents the reference noise mask). In this case, it is advantageous to take $K_0=(N_{pay}^{RA}+L_{coherent})/2$. The results are reproduced in the table below:

| $L_{coherent}$ | $\sigma_{\Delta\phi} = \sqrt{\sigma_{\Delta\theta}^2+\sigma_{\Delta\psi}^2}$ (degrees) | SIR (dB) |
|---|---|---|
| 15 | 13.5° | 12.5 |
| 31 | 10.6° | 14.6 |
| 50 | 8.27° | 16.8 |
| 70 | 7.56° | 17.6 |
| 150 | 6.25° | 19.2 |
| 212 | 5.86° | 19.8 |
| 424 | 5.3° | 20.6 |

$N_{pay}^{RA}$=424, so the last line of the table corresponds to the use of all the payload data for the phase estimation.

Note that, if we maintain $L_{coherent}$=31, the phase noise degrades the phase error ($\sigma_{\Delta\phi}$=10.6°), but that it is sufficient to take $L_{coherent}$=51 to compensate this entirely, at the cost of a slight increase in the complexity of the calculation. In the first implementation (estimate based on the preamble), the phase noise causes even greater degradation ($\sigma_{\Delta\phi}$ increases from 8° to 12.8°) that is much more difficult to compensate: an increase in the length of the preamble comprises a corresponding decrease in the number of information symbols transported by a packet. The superiority of the third implementation in the presence of phase noise may be explained by the fact that estimation uses the central portion of the packet, which leads to a result closer to the average phase than if the preamble is used, i.e. the first $N_{pre}^{RA}$ symbols.

If an estimate based on the first $L_{coherent}$=31 symbols ($K_0$=1) of the payload data is used to initialize a phase-locked loop (equation [33]) with $B_L T_s$=0.01, the phase error decreases to 7.7°, which corresponds to SIR=17.7 dB.

A final simulation corresponds to a SATMODE system operating at 8 kbaud in the presence of the FIG. 11 phase noise. The results are reproduced in the table below, in which the second column corresponds to an estimate based only on $L_{coherent}$ symbols of the payload data taken from the central portion of the packet, while the third column corresponds to an estimate obtained with the aid of the phase-locked loop of equation [33], initialized taking into account the first $L_{coherent}$ symbols of the payload data:

| $L_{coherent}$ | $\sigma_{\Delta\phi} = \sqrt{\sigma_{\Delta\theta}^2+\sigma_{\Delta\psi}^2}$ without PLL | $\sigma_{\Delta\phi} = \sqrt{\sigma_{\Delta\theta}^2+\sigma_{\Delta\psi}^2}$ with PLL |
|---|---|---|
| 31 | 22.2° | 10° |
| 70 | 19.9° | 9.9° |
| 150 | 18.9° | 9.9° |
| 212 | 5.86° | 10.2° |
| 424 | 5.3° | — |

Note that, in contrast to the above situations, the phase estimation error is not constantly reduced as $L_{coherent}$ is increased; an increase beyond 70-150 symbols even being harmful. This is explained by the fact that the greater the value of $L_{coherent}$, the smaller the number of symbols on which the loop can operate.

In conclusion, the third implementation of the invention considerably simplifies operations on transmission, and above all recovery operations on reception, without significantly degrading the performance of the invention. In the presence of a high level of phase noise and/or in low throughput applications, this third implementation may advantageously be combined with the second implementation.

What is claimed is:

1. A method, of transmitting data packets over a transmission channel shared by a plurality of users, the method comprising steps of:
    generating at least two replicas of each packet to be transmitted; and
    sending said replicas over said transmission channel, separated by random time and/or frequency shifts, wherein said step of sending data packets is effected with a particular period specific to each user and further comprising a step of modifying said transmission period as a function of a loading state of the shared transmission channel,
    the method further comprising a step of inserting signaling information into each replica for enabling the other replica(s) of the same packet to be located in the time and/or frequency domain, and
    wherein said step of modifying the transmission period comprises:
    increasing said transmission period with a first probability if said loading state of the shared transmission channel exceeds a threshold value; and
    reducing said transmission period with a second probability if said loading state of the shared transmission channel falls below said value.

2. A method according to claim 1, wherein said first probability is inversely proportional to said transmission period and said second probability is inversely proportional to said transmission period.

3. A method according to claim 1, wherein said generation step comprises the generation of exactly two replicas of each packet to be transmitted, wherein said sending step is effected for each replica within a time slot of a time division multiple access frame, and wherein said threshold value of the loading state of the shared transmission channel is from 0.35 to 0.45 packets per time slot.

4. A method of transmitting data packets over a transmission channel shared by a plurality of users, the method comprising steps of:
    generating at least two replicas of each packet to be transmitted; and
    sending said replicas over said transmission channel, separated by random time and/or frequency shifts,
    the method further comprising a step of inserting signaling information into each replica for enabling the other replica(s) of the same packet to be located in the time and/or frequency domain,
    wherein the absolute value of said time and/or frequency shift is determined with the aid of a pseudo-random function of at least a portion of the payload data contained in each packet and wherein said signaling information is information about the sign of said time and/or frequency shift.

5. A method of recovering on reception data packets transmitted over a transmission channel shared by a plurality of users by a transmission method in which at least two replicas of each packet to be transmitted are generated and the replicas are sent over the transmission channel separated by random time and/or frequency shifts, and wherein signaling information indicative of a location, in time and/or frequency, of other replicas of the same packet, is inserted into each replica for enabling the other replica(s) of the same packet to be located in the time and/or frequency domain, the method comprising steps of:

identifying, in a received signal, replicas that are not affected by destructive collisions with replicas of other packets; and extracting information contained in the identified replicas, the method further comprising steps of:

locating other replica(s) of the same packet in the time and/or frequency domain using signaling information extracted from the identified replicas;

canceling said other replica(s) at complex baseband level using an interference cancellation algorithm if they are affected by destructive collisions with replicas of other packets; and identifying other packets which, after said cancellation step, are no longer affected by destructive collisions, and extracting information contained therein;

wherein the step of identifying said replicas that are not affected by destructive collisions with other replicas comprises a step of searching for an acquisition bit sequence; and wherein said step of searching for an acquisition bit sequence comprises calculating the correlation between said received signal and pseudo-random bit sequences belonging to a family of quasi-orthogonal pseudo-random bit sequences.

6. A method according to claim 5, wherein said correlation calculations are effected in parallel for all the binary sequences of said family.

7. A method of recovering on reception data packets transmitted over a transmission channel shared by a plurality of users by a transmission method in which at least two replicas of each packet to be transmitted are generated and the replicas are sent over the transmission channel separated by random time and/or frequency shifts, and wherein signaling information indicative of a location, in time and/or frequency, of other replicas of the same packet, is inserted into each replica for enabling the other replica(s) of the same packet to be located in the time and/or frequency domain, the method comprising steps of:

identifying, in a received signal, replicas that are not affected by destructive collisions with replicas of other packets; and extracting information contained in the identified replicas, the method further comprising steps of locating other replica(s) of the same packet in the time and/or frequency domain using signaling information extracted from the identified replicas;

canceling said other replica(s) at complex baseband level using an interference cancellation algorithm if they are affected by destructive collisions with replicas of other packets; and identifying other packets which, after said cancellation step, are no longer affected by destructive collisions, and extracting information contained therein;

wherein the step of identifying said replicas that are not affected by destructive collisions with other replicas comprises a step of searching for an acquisition bit sequence; and wherein said step of extracting information contained in each replica thus identified comprises a step of estimating channel parameters from the acquisition bit sequence of said replica and a demodulation step using the results of said estimation operation.

8. A method according to claim 7, wherein said step of estimating channel parameters comprises estimating amplitude, frequency, phase, and delay parameters of said replica.

9. A method according to claim 8, wherein said step of canceling replicas affected by collisions comprises a prior step of regenerating said replicas at complex baseband level, and wherein said complex baseband regeneration step comprises using said amplitude, frequency and delay parameter estimates and an estimate of a phase parameter obtained directly from the portion of the received signal containing said replica to be regenerated.

10. A method according to claim 9, wherein said phase parameter is estimated from the portion of the received signal containing the acquisition bit sequence of said replica to be regenerated, exploiting the known bit sequence of said acquisition bit sequence.

11. A method according to claim 9, wherein said phase parameter is estimated from at least one fraction of the portion of the received signal containing the payload data of said replica to be regenerated, exploiting the known bit sequence expressing said payload data acquired from the corresponding replica not affected by collisions.

12. A method according to claim 9, wherein said estimate of a phase parameter is a time-dependent estimate obtained by means of a data-aided phase-locked loop exploiting the known bit sequence expressing the payload data of said replica to be regenerated acquired from the corresponding replica not affected by collision.

13. A method according to claim 12, wherein said data-aided phase-locked loop is initialized with a time-independent estimate of said phase parameter obtained in accordance with claim 10.

14. A method of recovering on reception data packets transmitted over a transmission channel shared by a plurality of users by a transmission method in which at least two replicas of each packet to be transmitted are generated and the replicas are sent over the transmission channel separated by random time and/or frequency shifts, and wherein signaling information indicative of a location, in time and/or frequency, of other replicas of the same packet, is inserted into each replica for enabling the other replica(s) of the same packet to be located in the time and/or frequency domain, the method comprising steps of:

identifying, in a received signal, replicas that are not affected by destructive collisions with replicas of other packets; and extracting information contained in the identified replicas, the method further comprising steps of locating other replica(s) of the same packet in the time and/or frequency domain using signaling information extracted from the identified replicas;

canceling said other replica(s) at complex baseband level using an interference cancellation algorithm if they are affected by destructive collisions with replicas of other packets; and identifying other packets which, after said cancellation step, are no longer affected by destructive collisions, and extracting information contained therein;

wherein said step of canceling replicas affected by collisions comprises a prior step of regenerating said replicas at complex baseband level.

15. A method of recovering on reception data packets transmitted over a transmission channel shared by a plurality of users by a transmission method in which at least two replicas of each packet to be transmitted are generated and the replicas are sent over the transmission channel separated by random time and/or frequency shifts, and wherein signaling information indicative of a location, in time and/or frequency, of other replicas of the same packet, is inserted into each replica for enabling the other replica(s) of the same packet to be located in the time and/or frequency domain, the method comprising steps of:

identifying, in a received signal, replicas that are not affected by destructive collisions with replicas of other packets; and extracting information contained in the identified replicas, the method further comprising steps of:

locating other replica(s) of the same packet in the time and/or frequency domain using signaling information extracted from the identified replicas;

canceling said other replica(s) at complex baseband level using an interference cancellation algorithm if they are affected by destructive collisions with replicas of other packets; and identifying other packets which, after said cancellation step, are no longer affected by destructive collisions, and extracting information contained therein;

wherein said step of locating in the time and/or frequency domain comprises extracting signaling information representing the sign of the time and/or frequency shift between each identified replica and other replica(s) of the same packet and determining the absolute value of said shift with the aid of a pseudo-random function of at least a portion of the payload data contained in said packet.

16. A method of recovering on reception data packets transmitted over a transmission channel shared by a plurality of users by a transmission method in which at least two replicas of each packet to be transmitted are generated and the replicas are sent over the transmission channel separated by random time and/or frequency shifts, and wherein signaling information indicative of a location, in time and/or frequency, of other replicas of the same packet, is inserted into each replica for enabling the other replica(s) of the same packet to be located in the time and/or frequency domain, the method comprising steps of:

identifying, in a received signal, replicas that are not affected by destructive collisions with replicas of other packets; and extracting information contained in the identified replicas, the method further comprising steps of:

locating other replica(s) of the same packet in the time and/or frequency domain using signaling information extracted from the identified replicas;

canceling said other replica(s) at complex baseband level using an interference cancellation algorithm if they are affected by destructive collisions with replicas of other packets; and identifying other packets which, after said cancellation step, are no longer affected by destructive collisions, and extracting information contained therein;

wherein said step of locating other replica(s) of the same packet in the time and/or frequency domain using the signaling information extracted from the identified replicas, said step of canceling said other replica(s) at complex baseband level by an interference cancellation algorithm, and said step of identifying other packets which, after said cancellation step, are no longer affected by destructive collisions and extracting the information contained therein, are repeated iteratively until the information contained in all of the received packets has been extracted or a maximum number of iterations is reached.

17. Equipment for transmitting data packets over a transmission channel shared by a plurality of users, the equipment comprising:

a device for generating at least two replicas of each packet to be transmitted with a random time and/or frequency shift between them; and a device for sending said replicas over said transmission channel, the equipment further comprising:

a device for generating, for each replica, signaling information for locating other replica(s) of the same packet in the time and/or frequency domain;

a first multiplexer for assembling each replica and the corresponding signaling information for the conjoint transmission thereof;

a flow control device for receiving information as to a loading state of the shared transmission channel and for modifying a transmission period as a function of said shared transmission channel loading state information, wherein said flow control device is a device for increasing said transmission period with a first probability if said loading state of the shared transmission channel exceeds a threshold value and reducing said transmission period with a second probability if said loading state of the shared transmission channel falls said threshold value.

18. Equipment for transmitting data packets over a transmission channel shared by a plurality of users, the equipment comprising:

a device for generating at least two replicas of each packet to be transmitted with a random time and/or frequency shift between them; and a device for sending said replicas over said transmission channel, the equipment further comprising:

a device for generating, for each replica, signaling information for locating other replica(s) of the same packet in the time and/or frequency domain; and a first multiplexer for assembling each replica and the corresponding signaling information for the conjoint transmission thereof, wherein said device for generating at least two replicas of each packet comprises means for determining the absolute value of said time and/or frequency shift with the aid of a pseudo-random function of at least a portion of the payload data contained in each packet.

19. Equipment for recovering at a receiver data packets transmitted over a transmission channel shared by a plurality of users, the equipment comprising:

a device for identifying replicas that are not affected by destructive collisions with replicas of other packets, wherein said device for identifying replicas that are not affected by destructive collisions with replicas of other packets searches in parallel for acquisition pseudo-random bit sequences belonging to a family of quasi-orthogonal bit sequences;

a device for extracting information contained in the identified replicas, a device for using the extracted signaling information to locate other replica(s) of the same packet in the time and/or frequency domain; and a device for canceling said other replica(s) at complex baseband level using an interference cancellation algorithm if it is or they are affected by destructive collisions with replicas of other packets.

20. Equipment for recovering at a receiver data packets transmitted over a transmission channel shared by a plurality of users, the equipment comprising:
- a device for identifying replicas that are not affected by destructive collisions with replicas of other packets, wherein said device for identifying replicas that are not affected by destructive collisions with replicas of other packets searches in parallel for acquisition pseudo-random bit sequences belonging to a family of quasi-orthogonal bit sequences;
- a device for extracting information contained in the identified replicas,
- a device for using the extracted signaling information to locate other replica(s) of the same packet in the time and/or frequency domain; and
- a device for canceling said other replica(s) at complex baseband level using an interference cancellation algorithm if it is or they are affected by destructive collisions with replicas of other packets;

wherein said acquisition bit sequence(s) are preambles.

21. Equipment for recovering at a receiver data packets transmitted over a transmission channel shared by a plurality of users, the equipment comprising:
- a device for identifying replicas that are not affected by destructive collisions with replicas of other packets, wherein said device for identifying replicas that are not affected by destructive collisions with replicas of other packets searches in parallel for acquisition pseudo-random bit sequences belonging to a family of quasi-orthogonal bit sequences;
- a device for extracting information contained in the identified replicas, wherein said device for extracting information contained in each identified replica comprises a device for estimating parameters of the channel from an acquisition bit sequence of said replica to demodulate said replica using said estimates;
- a device for using the extracted signaling information to locate other replica(s) of the same packet in the time and/or frequency domain; and
- a device for canceling said other replica(s) at complex baseband level using an interference cancellation algorithm if it is or they are affected by destructive collisions with replicas of other packets.

22. Equipment for recovering at a receiver data packets transmitted over a transmission channel shared by a plurality of users, the equipment comprising:
- a device for identifying replicas that are not affected by destructive collisions with replicas of other packets, wherein said device for identifying replicas that are not affected by destructive collisions with replicas of other packets searches in parallel for acquisition pseudo-random bit sequences belonging to a family of quasi-orthogonal bit sequences;
- a device for extracting information contained in the identified replicas, wherein said device for extracting information contained in each identified replica comprises a device for estimating parameters of the channel from an acquisition bit sequence of said replica to demodulate said replica using said estimates, wherein said device for estimating channel parameters estimates amplitude, frequency, phase and delay parameters of said replicas;
- a device for using the extracted signaling information to locate other replica(s) of the same packet in the time and/or frequency domain; and
- a device for canceling said other replica(s) at complex baseband level using an interference cancellation algorithm if it is or they are affected by destructive collisions with replicas of other packets.

23. Equipment for recovering at a receiver data packets transmitted over a transmission channel shared by a plurality of users, the equipment comprising:
- a device for identifying replicas that are not affected by destructive collisions with replicas of other packets; and
- a device for extracting information contained in the identified replicas, the equipment further comprising:
- a device for using the extracted signaling information to locate other replica(s) of the same packet in the time and/or frequency domain;
- a device for canceling said other replica(s) at complex baseband level using an interference cancellation algorithm if it is or they are affected by destructive collisions with replicas of other packets; and
- a device for regenerating said other replica(s) to be cancelled at complex baseband level, the replica(s) regenerated at complex baseband level being supplied to the input of said cancellation device.

24. Equipment for recovering at a receiver data packets transmitted over a transmission channel shared by a plurality of users, the equipment comprising:
- a device for identifying replicas that are not affected by destructive collisions with replicas of other packets; and
- a device for extracting information contained in the identified replicas, the equipment further comprising:
- a device for using the extracted signaling information to locate other replica(s) of the same packet in the time and/or frequency domain;
- a device for canceling said other replica(s) at complex baseband level using an interference cancellation algorithm if it is or they are affected by destructive collisions with replicas of other packets;
- a device for regenerating said other replica(s) to be cancelled at complex baseband level, the replica(s) regenerated at complex baseband level being supplied to the input of said cancellation device; and
- a device for estimating a phase parameter of the replica to be cancelled from the portion of the received signal containing said replica to be cancelled, said phase parameter being supplied to the input of said device for regeneration at complex baseband level.

25. Equipment for recovering at a receiver data packets transmitted over a transmission channel shared by a plurality of users, the equipment comprising:
- a device for identifying replicas that are not affected by destructive collisions with replicas of other packets; and
- a device for extracting information contained in the identified replicas, the equipment further comprising:
- a device for using the extracted signaling information to locate other replica(s) of the same packet in the time and/or frequency domain;
- a device for canceling said other replica(s) at complex baseband level using an interference cancellation algorithm if it is or they are affected by destructive collisions with replicas of other packets;
- a device for regenerating said other replica(s) to be cancelled at complex baseband level, the replica(s) regenerated at complex baseband level being supplied to the input of said cancellation device; and
- a device for estimating a phase parameter of the replica to be cancelled from the portion of the received signal containing said replica to be cancelled, said phase parameter being supplied to the input of said device for regeneration at complex baseband level, wherein said device for estimating a phase parameter estimates said phase parameter from the portion of the received signal containing an acquisition bit sequence of said replica to be cancelled, exploiting the known acquisition bit sequence.

26. Equipment for recovering at a receiver data packets transmitted over a transmission channel shared by a plurality of users, the equipment comprising:
a device for identifying replicas that are not affected by destructive collisions with replicas of other packets; and
a device for extracting information contained in the identified replicas,
the equipment further comprising:
a device for using the extracted signaling information to locate other replica(s) of the same packet in the time and/or frequency domain;
a device for canceling said other replica(s) at complex baseband level using an interference cancellation algorithm if it is or they are affected by destructive collisions with replicas of other packets;
a device for regenerating said other replica(s) to be cancelled at complex baseband level, the replica(s) regenerated at complex baseband level being supplied to the input of said cancellation device; and
a device for estimating a phase parameter of the replica to be cancelled from the portion of the received signal containing said replica to be cancelled, said phase parameter being supplied to the input of said device for regeneration at complex baseband level, wherein said device for estimating a phase parameter estimates said phase parameter from at least one fraction of the portion of the received signal containing the payload data of said replica to be regenerated, exploiting the known bit sequence expressing said payload data acquired from the corresponding replica not affected by collision.

27. Equipment for recovering at a receiver data packets transmitted over a transmission channel shared by a plurality of users, the equipment comprising:
a device for identifying replicas that are not affected by destructive collisions with replicas of other packets; and
a device for extracting information contained in the identified replicas,
the equipment further comprising:
a device for using the extracted signaling information to locate other replica(s) of the same packet in the time and/or frequency domain;
a device for canceling said other replica(s) at complex baseband level using an interference cancellation algorithm if it is or they are affected by destructive collisions with replicas of other packets;
a device for regenerating said other replica(s) to be cancelled at complex baseband level, the replica(s) regenerated at complex baseband level being supplied to the input of said cancellation device; and
a device for estimating a phase parameter of the replica to be cancelled from the portion of the received signal containing said replica to be cancelled, said phase parameter being supplied to the input of said device for regeneration at complex baseband level, wherein said device for estimating a phase parameter comprises a data-aided phase-locked loop for producing a time-dependent estimate of said phase parameter exploiting the known bit sequence expressing the payload data of said replica to be regenerated and acquired from the corresponding replica not affected by collision.

28. Equipment for recovering at a receiver data packets transmitted over a transmission channel shared by a plurality of users, the equipment comprising:
a device for identifying replicas that are not affected by destructive collisions with replicas of other packets; and
a device for extracting information contained in the identified replicas,
the equipment further comprising:
a device for using the extracted signaling information to locate other replica(s) of the same packet in the time and/or frequency domain;
a device for canceling said other replica(s) at complex baseband level using an interference cancellation algorithm if it is or they are affected by destructive collisions with replicas of other packets;
a device for regenerating said other replica(s) to be cancelled at complex baseband level, the replica(s) regenerated at complex baseband level being supplied to the input of said cancellation device; and
a device for estimating a phase parameter of the replica to be cancelled from the portion of the received signal containing said replica to be cancelled, said phase parameter being supplied to the input of said device for regeneration at complex baseband level, wherein said device for estimating a phase parameter comprises a data-aided phase-locked loop for producing a time-dependent estimate of said phase parameter exploiting the known bit sequence expressing the payload data of said replica to be regenerated and acquired from the corresponding replica not affected by collision, and wherein said device for estimating a phase parameter comprises a unit for initializing said phase-locked loop to a time-independent estimate obtained from the portion of the received signal containing an acquisition bit sequence of said replica to be cancelled, exploiting the known binary sequence.

29. Equipment for recovering at a receiver data packets transmitted over a transmission channel shared by a plurality of users, the equipment comprising:
a device for identifying replicas that are not affected by destructive collisions with replicas of other packets; and
a device for extracting information contained in the identified replicas,
the equipment further comprising:
a device for using the extracted signaling information to locate other replica(s) of the same packet in the time and/or frequency domain;
a device for canceling said other replica(s) at complex baseband level using an interference cancellation algorithm if it is or they are affected by destructive collisions with replicas of other packets;
a device for regenerating said other replica(s) to be cancelled at complex baseband level, the replica(s) regenerated at complex baseband level being supplied to the input of said cancellation device; and
a device for estimating a phase parameter of the replica to be cancelled from the portion of the received signal containing said replica to be cancelled, said phase parameter being supplied to the input of said device for regeneration at complex baseband level, wherein said device for estimating a phase parameter comprises a data-aided phase-locked loop for producing a time-dependent estimate of said phase parameter exploiting the known bit sequence expressing the payload data of said replica to be regenerated acquired from the corresponding replica not affected by collision, and wherein said device for estimating a phase parameter comprises a unit for initializing said phase-locked loop to a time-independent estimate obtained from at least a fraction of the portion of the received signal containing the payload data of said replica to be regenerated, exploiting the known bit sequence expressing said payload data acquired from the corresponding replica not affected by collisions.

30. Equipment for recovering at a receiver data packets transmitted over a transmission channel shared by a plurality of users, the equipment comprising:
- a device for identifying replicas that are not affected by destructive collisions with replicas of other packets; and
- a device for extracting information contained in the identified replicas, the equipment further comprising:
- a device for using the extracted signaling information to locate other replica(s) of the same packet in the time and/or frequency domain, wherein said device for using the extracted signaling information comprises means for determining the absolute value of the time and/or frequency shift between each identified replica and the other replica(s) of the same packet using a pseudo-random function of at least a portion of the payload data contained in said packet and the sign of said shift, with the aid of said signaling information; and
- a device for canceling said other replica(s) at complex baseband level using an interference cancellation algorithm if it is or they are affected by destructive collisions with replicas of other packets.

* * * * *